July 24, 1956 F. C. WILLIAMS ET AL 2,755,996

DIGITAL DATA STORAGE SYSTEMS

Filed Nov. 9, 1951 14 Sheets-Sheet 1

INVENTORS:
F. C. WILLIAMS
T. KILBURN
E. R. LAITHWAITE
ATTORNEYS:
Morse & Hall

Inventors:
F.C. Williams
T. Kilburn
E.R. Laithwaite
Attorneys:
Morse & Hall

July 24, 1956 F. C. WILLIAMS ET AL 2,755,996

DIGITAL DATA STORAGE SYSTEMS

Filed Nov. 9, 1951 14 Sheets-Sheet 3

INVENTORS:
F. C. WILLIAMS
T. KILBURN
E. R. LAITHWAITE
ATTORNEYS:
Moore & Hall

INVENTORS:
F.C. WILLIAMS
T. KILBURN
E.R. LAITHWAITE
ATTORNEYS:
Morrison & Hall

INVENTORS:
F.C. WILLIAMS
T. KILBURN
E.R. LAITHWAITE
ATTORNEYS:
Moore & Hall

INVENTORS:
F.C. WILLIAMS
T. KILBURN
E.R. LAITHWAITE
ATTORNEYS:
Morrow & Hall

INVENTORS:
F.C. WILLIAMS
T. KILBURN
E.R. LAITHWAITE
ATTORNEYS:
Morse & Hall

INVENTORS:
F.C. WILLIAMS
T. KILBURN
E.R. LAITHWAITE
ATTORNEYS:
Morris & Hall

INVENTORS
F.C. WILLIAMS
T. KILBURN
E.R. LAITHWAITE
ATTORNEYS:
Morow & Hall

INVENTORS:
F.C. WILLIAMS
T. KILBURN
E.R. LAITHWAITE
ATTORNEYS:
Morrow & Hall

INVENTORS:
F.C WILLIAMS
T. KILBURN
E.R. LAITHWAITE
ATTORNEYS:
Morris & Keel

INVENTORS:
F.C. WILLIAMS
T. KILBURN
E.R. LAITHWAITE
ATTORNEYS:
Morse & Hall

INVENTORS:
F.C. WILLIAMS
T. KILBURN
E.R. LAITHWAITE
ATTORNEYS:
Morris & Hall

INVENTORS.
TOM KILBURN, FREDERIC CALLAND WILLIAMS
AND ERIC ROBERTS LAITHWAITE.
BY Stevens, Davis, Miller & Mosher
ATTORNEYS.

United States Patent Office 2,755,996

Patented July 24, 1956

2,755,996

DIGITAL DATA STORAGE SYSTEMS

Frederic Calland Williams, Timperley, Tom Kilburn, Manchester, and Eric Roberts Laithwaite, Kirkham, England, assignors to National Research Development Corporation, London, England, a corporation of Great Britain Application November 9, 1951, Serial No. 255,568

Claims priority, application Great Britain November 10, 1950

19 Claims. (Cl. 235—61.11)

This invention relates to systems and apparatus for the storage of information, more particularly although by no means exclusively, binary digital data, in such a form that the stored data may be readily reproduced dynamically as electric pulse train signals. The invention is particularly applicable to use in conjunction with electronic binary digital computing machines employing high-speed electrostatic storage devices of the Williams' cathode-ray-tube type. Examples of such machines are described in the specifications of the following copending patent applications:

Ser. No. 141,176, hereinafter referred to as specification A,

Ser. No. 165,434, hereinafter referred to as specification B,

Ser. No. 226,761, hereinafter referred to as specification C.

In the specification of copending application Ser. No. 218,924 hereinafter referred to as specification D, there is described an information storage system in which a plurality of planar cards each have information recorded thereon as areas whose light-transmitting capacity is different from that of the other adjacent regions of the card and in which such cards are arranged in stacked relationship and associated with means for moving any selected card relatively to the remainder of the stack so as to present the information-bearing areas thereof at a position suitable for inspection by associated optical scanning means.

In a particular form of the invention described in such prior specification, the various information items are arranged in similar positions on each card as a series of parallel rows and adjacent each of these rows, at a common predetermined parallel spaced relationship, each card is provided with regions of good light-transmitting capacity whereby, when the cards are arranged in face-to-face stacked relationship, any information-bearing row on any single card may be selectively inspected by displacing such card relatively to the remainder of the cards of the stack so as to bring the information-bearing rows of such card opposite to the related good light-transmitting regions of the remaining cards and then reading such information-bearing rows of the selected card through the aligned light-transmitting or inspection regions of the remaining cards.

The reading of the selected card is effected by the provision of a source of light at one end of the stack of cards and optical viewing means at the other end of the stack and in the aforesaid particular arrangement such light source is of the kind which executes an optical scanning movement along each of the information-bearing rows of the selected card in turn and is conveniently provided by a light spot formed on the fluorescent screen of a cathode-ray-tube whose electron beam is constrained to execute a raster-scanning motion in alignment with said information-bearing rows of the selected card.

The object of the present invention is to provide means by which such a moving light spot, for example, a light spot produced on a cathode-ray-tube screen, may be accurately controlled in its scanning movement whereby the resultant dynamic form signals obtained from the optical viewing device at the other end of the stack of cards are in proper synchronism with some related mechanism, for instance, an electronic digital computing machine, with which the information storage device is co-operating.

According to the present invention, control of the scanning movement of a light spot for illuminating in turn each of the successive recording positions on a card having information items recorded thereon as a row of spaced areas of different light-transmitting capacity, is effected by the provision of an additional recording area at a predetermined position before the beginning of and at a predetermined position after the end of said row and by comparing the timing of the output signal obtained when the light spot passes over such additional areas with appropriate timing signals derived from the apparatus into which the dynamic signal from the remaining recording areas of the row is to be supplied.

In the preferred form of the invention, in which a plurality of linear information-bearing rows are arranged in parallel spaced relationship and the light spot is caused to execute a raster-like movement along each row in turn, control of the movement of the light spot along each row is effected by the comparison of signals resulting from the passage of the light spot over additional recording areas provided before the beginning of and after the end of each row with appropriate timing signals derived from the associated apparatus while control of the progressive deflection of the light spot in a direction at right angles to that of its row-scanning motion in order to scan each row in turn is effected by comparing with each other the relative time durations of the respective signals obtained by passage of the light spot over the additional recording areas at the ends of the first row and by comparing with each other the relative time durations of the respective signals obtained by passage of the light spot over the additional recording areas at the ends of the last row, such additional recording areas at the opposite ends of said first and last rows being so shaped geometrically that the respective time durations of the compared signals vary in inverse sense according to whether said light spot is above or below the mean or optimum deflection position for scanning the first or last rows.

In order that the various features of the invention may be more readily understood one embodiment thereof will now be particularly described with reference to the accompanying drawings in which:

Figs. 1*a* and 1*b* form, in combination, a block schematic diagram of an information storage system in accordance with the aforesaid specification D and embodying the present invention and the principal elements of an associated electronic digital computing machine.

Figures 12A, 12B:
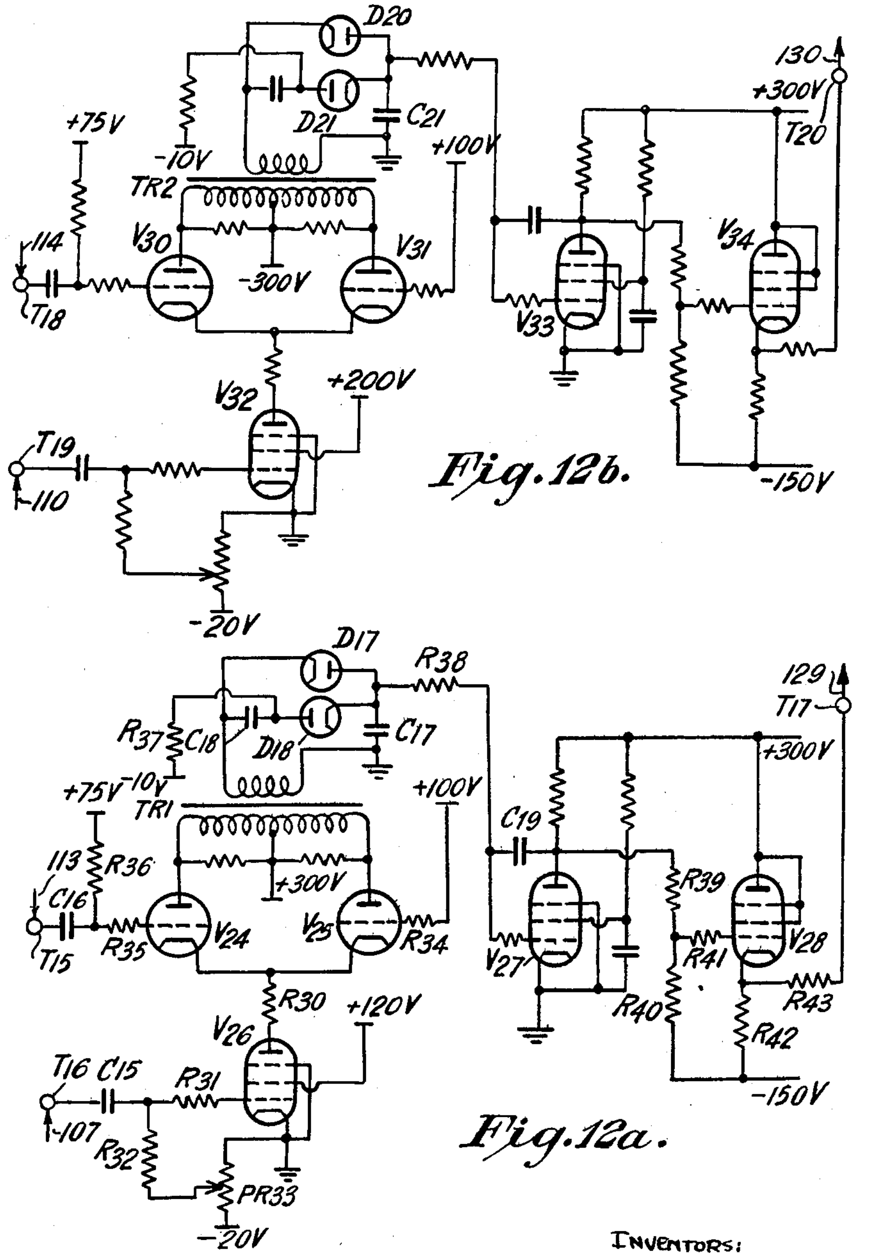

Figs. 12*a* and 12*b* are circuit diagrams showing the apparatus for effecting servo-control of the deflection rate and beam shift in the X-direction of scanning movement of the cathode-ray-tube light spot.

Figure 13:
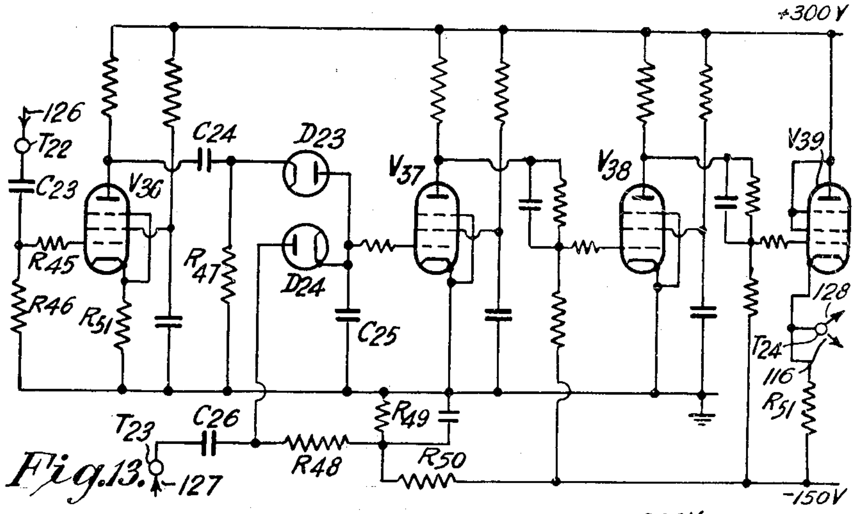

Fig. 13 is a circuit diagram of a trigger circuit used in connection with the Y-time base circuits.

Figure 14:
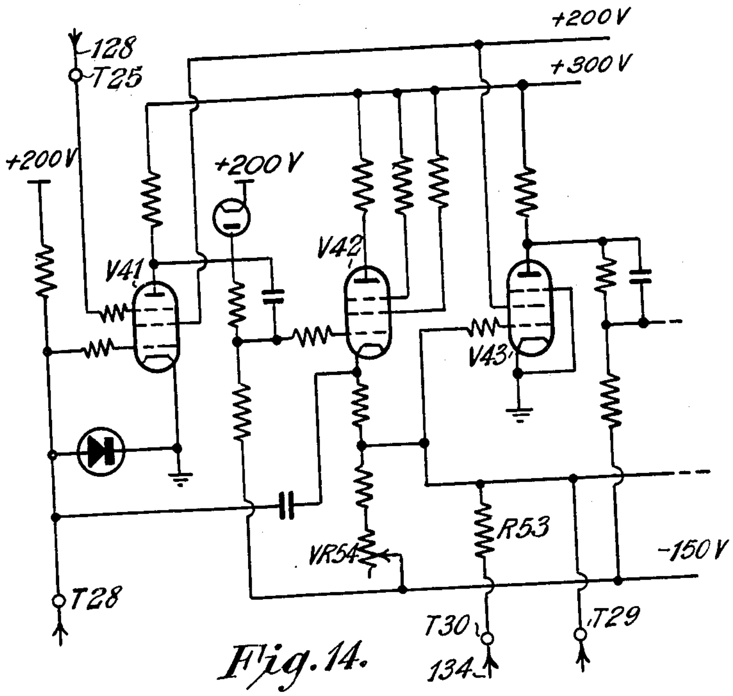

Fig. 14 is a fragmentary circuit diagram of the Y-time base circuits used for providing deflection in the Y-direction of the cathode-ray-tube beam.

Figure 15:
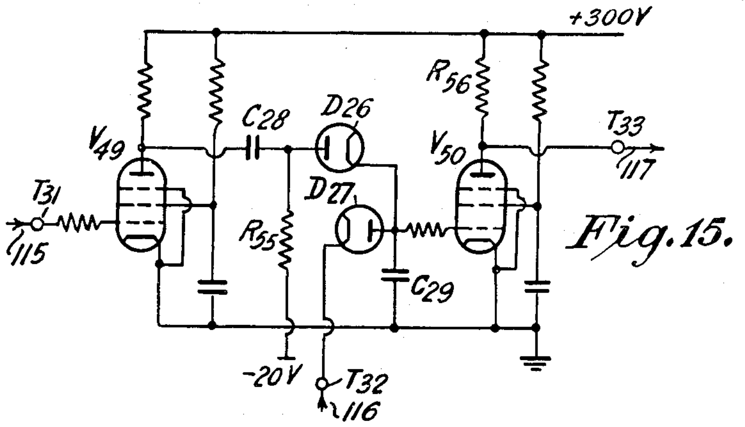
Figure 16:
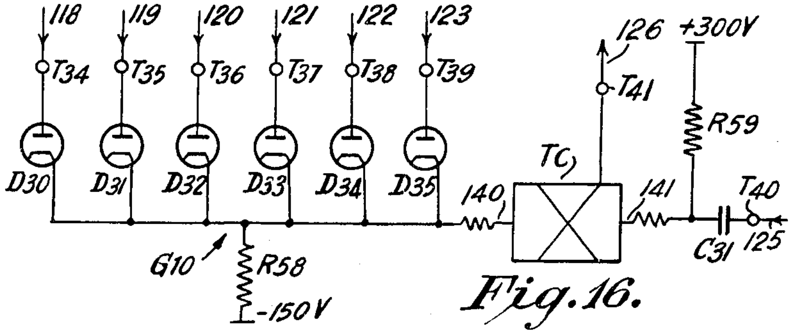
Figure 17:
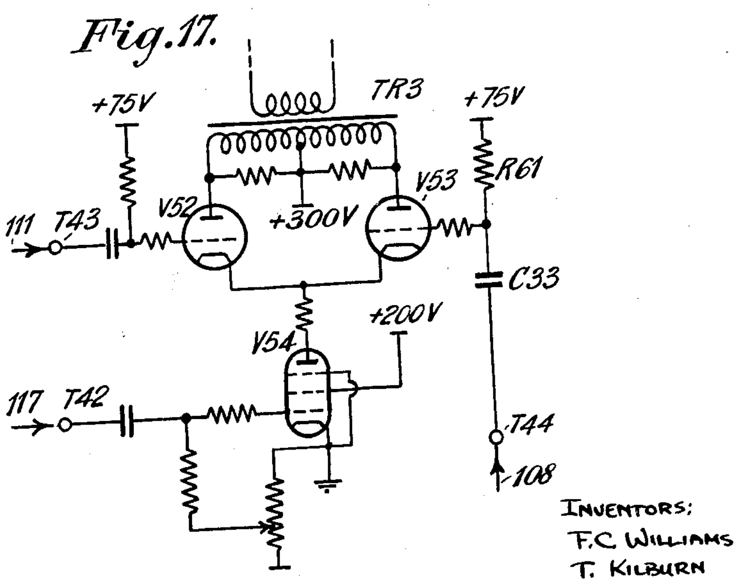

Figs. 15 and 16 are circuit diagrams of the Line 0 and Line 31 waveform generators associated with the Y-time base servo-control arrangements while Fig. 17 is a fragmentary diagram of the associated rate and shift servo-mechanisms for the Y-time base.

Figure 6:
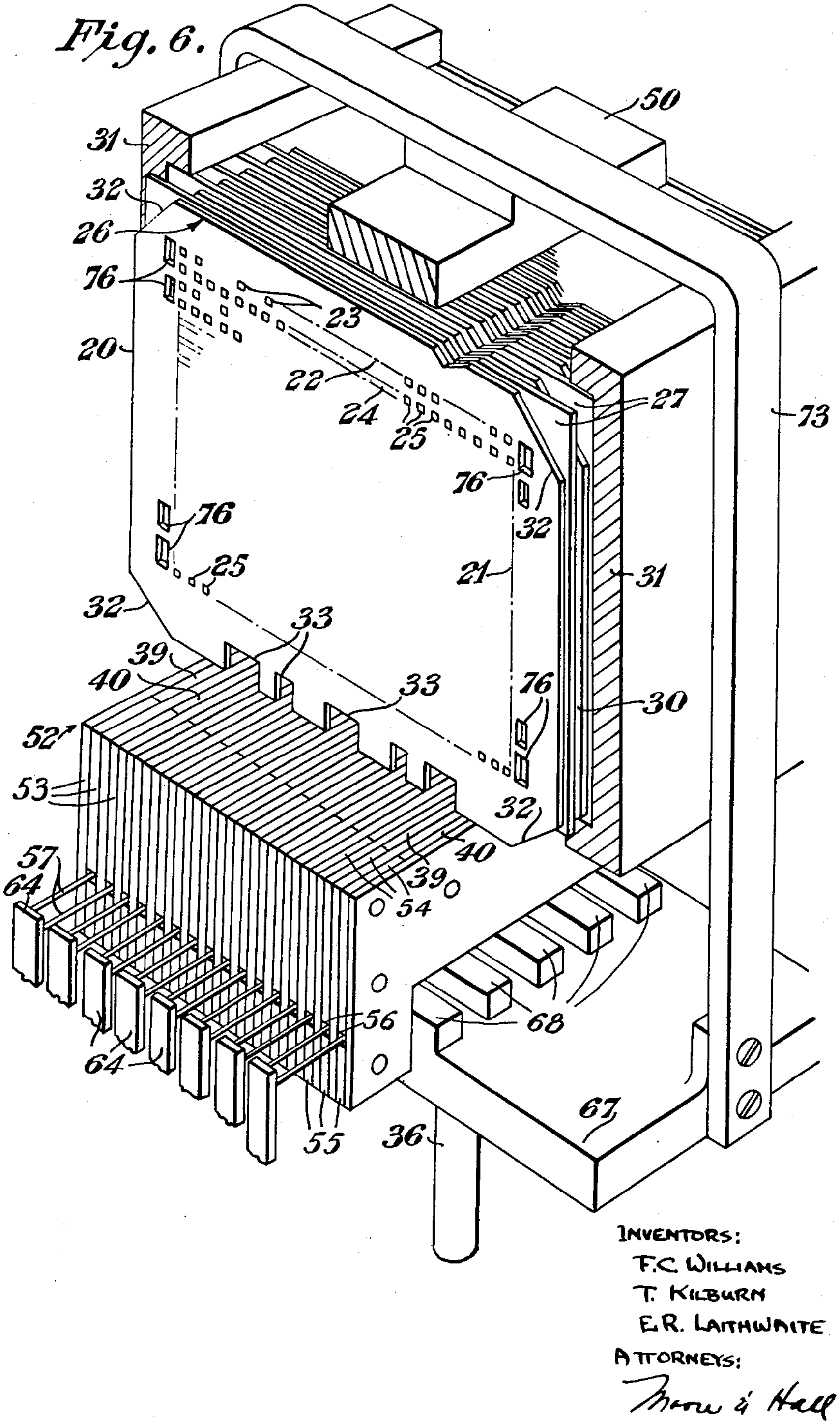
Fig. 6 is a fragmentary perspective view showing one form of card stacking and selecting device as described in detail in said specification D.
Figure 18:
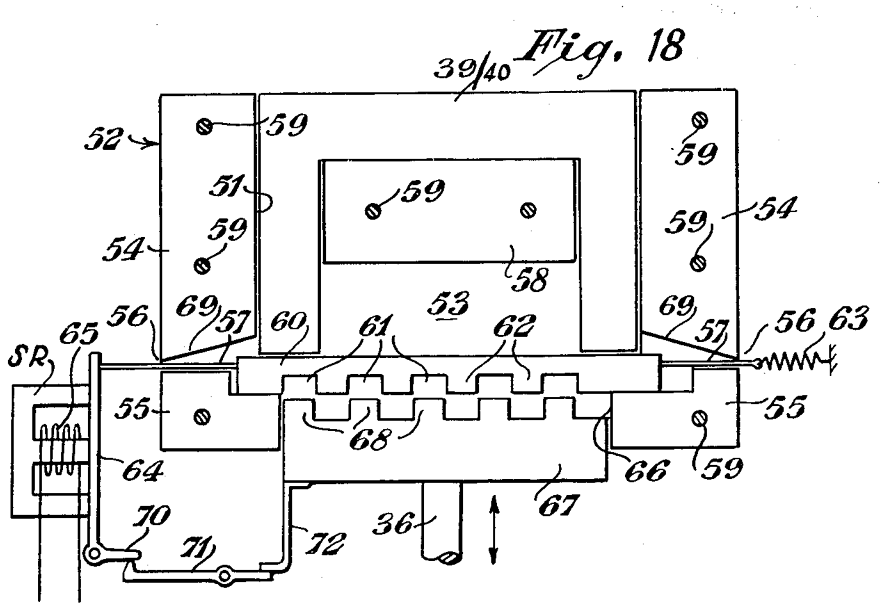

Fig. 18 is a sectional view through part of the card selecting mechanism of Fig. 6.

Figure 19:
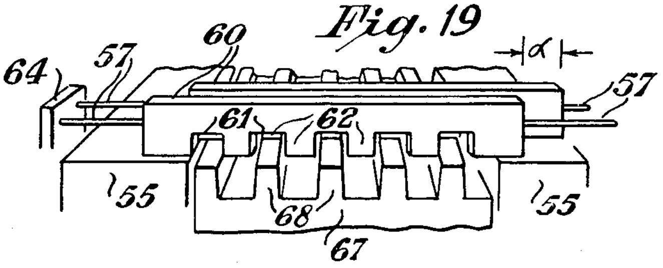

Fig. 19 is a fragmentary perspective view showing the arrangement of parts of the card selecting members of Fig. 18.

Figure 20:
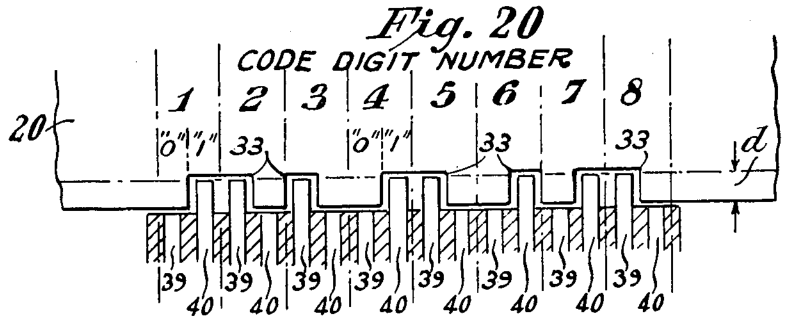

Fig. 20 is an enlarged fragmentary view of the lower edge of a card and the card selector members.

The particular embodiment chosen as an example for detailed explanation of the invention is one adapted for use with a multiple and stacked card store of the form described in the aforesaid specification D and in association with an electronic binary digital computing machine of the kind described in the aforesaid specifications A, B and C.

In order that the subsequent detailed description of such chosen embodiment may be more readily understood a brief description of such form of computing machine and of such a stacked card type store will first be given with reference to Figs. 1–6.

Figure 1A:
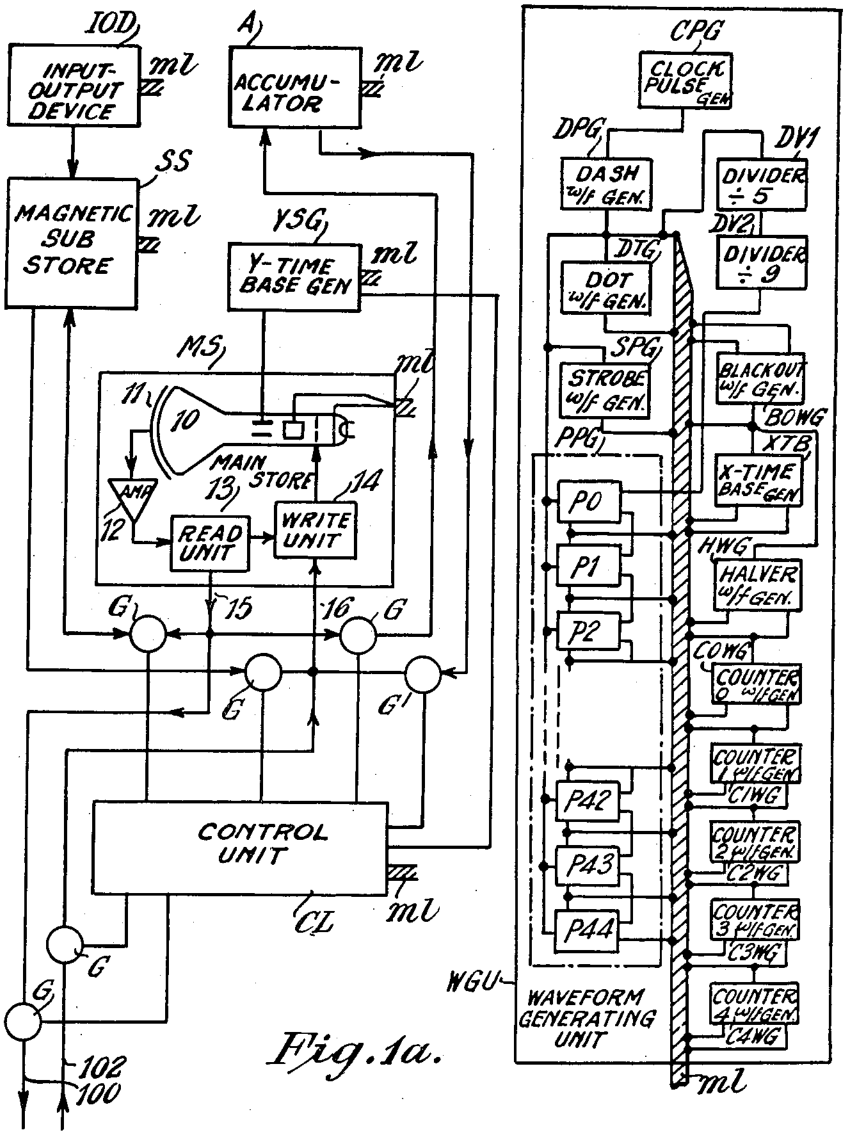

Referring first to Fig. 1*a*, the computing machine follows the now-conventional form of including a main store MS having a high-speed of access to any of the number or instruction words held therein an accumulator A which includes one or more computing circuits, for example, an adding device and a multiplying device, a subsidiary store SS, for example, a magnetic drum store, of larger capacity but lower speed of access than the store MS, an input/output device IOD by which the requisite data and instructions may be loaded into the machine and by which the required answer information may be extracted from the machine and a control unit CL which operates to control the operation of the machine as a whole in accordance with the set program of instructions by opening and closing appropriate gate and like devices G whereby the various instructions are obeyed in the desired order to cause selection of the required data items and their routing between the main store MS, the accumulator A, the subsidiary store SS and the input/output device IOD.

As the detailed manner of operation of the computing machine itself is of no importance in its relation to the present invention, attention will be concentrated upon the waveforms generated in the various elements of the waveform generator unit WGU and used in the machine to control its operating rhythm, with which the card type store embodying the present invention is to be synchronised.

The main store MS includes an electrostatic store of the cathode-ray-tube type as described by F. C. Williams and T. Kilburn in the Journal of the Institution of Electrical Engineers, vol. 96, pt. III, March 1949, pp. 81 to 100, and comprises a cathode-ray-tube 10 with its signal pick-up plate 11 feeding signals to an amplifier 12 which, in turn, feeds them to a read unit 13 by which the amplified output signals are converted into pulse-train form suitable for circulation through the remainder of the computing machine over lead 15 and/or for supply to the write unit 14 by which such pulse-train signal from the read unit is caused to modulate the beam of the tube 10 so as to regenerate the previously stored signals. Alternatively the write unit 14 may be controlled by an externally available input signal on lead 16 to cause such signal to be written into the store instead of a previously stored signal.

Although only one storage tube 10 with its ancillary apparatus is shown in the main store MS, there will normally be a number of such tubes and the control unit CL will arrange for the selection of the appropriate one as part of its normal function. Each tube, in this present embodiment, has a storage capacity of thirty-two separate forty-digit numbers arranged one in each of thirty-two horizontal lines of a television-type raster pattern on the cathode-ray-tube screen. In the dynamic or pulse-signal train form, each binary "1" digit is represented by a negative-going square pulse during the first six microseconds of a ten microsecond interval allotted to each digit of the number while the binary digit "0" is represented by the absence of such a pulse during the related digit-interval.

The master control of the machine rhythm is by a master oscillator or Clock Pulse generator CPG which provides a 100 kc./s. sinusoidal oscillation of stable frequency. This oscillation is then supplied to the Dash waveform generator DPG which effects asymmetric squaring to form the Dash waveform of diagram (*a*), Fig. 2, consisting of negative-going square pulses during the first six microseconds of each ten microsecond oscillation period. Such ten-microsecond intervals between the leading edges of consecutive Dash pulses constitute the digit intervals of the machine rhythm and the negative Dash pulse, when present in any such digit-interval constitutes the aforesaid binary "1" digit signal.

From the Dash waveform is derived the Dot and Strobe waveforms used in the read and write units 13, 14. The Dot waveform is generated in unit DTG which consists of a differentiating and pulse-squaring circuit by which a series of negative-going pulses, each of some two microseconds duration, are provided with their leading edges in synchronism with the leading edges of the related Dash pulses. The Strobe waveform is generated in unit SPG which is another differentiating and pulse-squaring circuit including a short time-delay by which a series of positive-going pulses, each of approximately one-microsecond duration, are provided with their leading edges delayed approximately one-half microsecond behind the leading edges of the related Dash and Dot pulses.

The Dash waveform is also applied to a frequency-dividing or pulse counting-down circuit DV1 which provides an output pulse for every five input pulses and the output of this circuit is, in turn, applied to a second dividing circuit DV2 which provides an output pulse for every nine input pulses. The output from this second circuit, therefore consists of a pulse in synchronism with every forty-fifth Dash pulse and the time period of such forty-five digit intervals consistutes the beat or minor cycle period of the machine. The first forty digit intervals $p0$, $p1$ . . . $p39$ of each beat are concerned with dealing respectively with the forty binary digits of the numbers used while the remaining five digit periods $p40$ . . . $p44$ are reserved for the fly-back period of the beam or beams of the cathode-ray-storage tube or tubes. This flyback or Blackout period, when the beams are suppressed, is controlled by the negative-going pulse period of the Blackout waveform of diagram (*b*), Fig. 2, and whose manner of generation will be described later.

Figure 2:
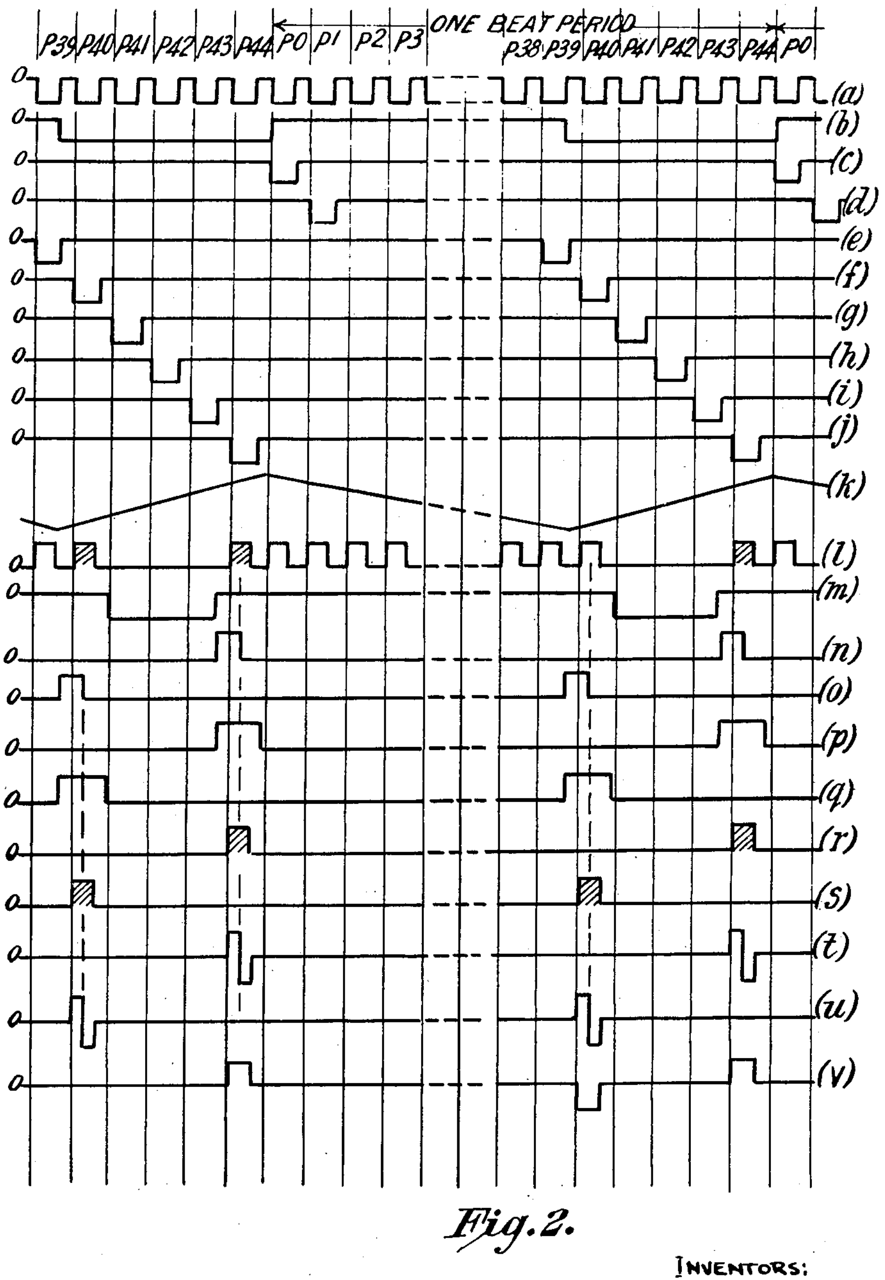
Figs. 2 and 3 show a number of different electric waveforms used in the apparatus for control purposes.

For the purpose of identifying and selecting any one of the forty-five digit periods in each beat, there is provided, each on separate leads, a series of isolated pulses, known as $p$-Pulses, the $p0$-Pulse waveform shown in diagram (*c*), Fig. 2, consisting of a single Dash pulse in the first digit interval, *p*0, of each beat, the *p*1-Pulse waveform of diagram (*d*), Fig. 2, consisting of a single Dash pulse in the second digit interval of each beat and so on. Diagrams (*e*), (*f*), (*g*), (*h*), (*i*) and (*j*), Fig. 2, illustrate the particular *p*-Pulse waveforms for identifying the *p*39, *p*40, *p*41, *p*42, *p*43 and *p*44 digit intervals of each beat. The remainder, not illustrated, are similar. The generation of such *p*-Pulse waveforms is effected by the pulse separator circuit PPG which is of the kind described in the aforesaid earlier specification B and C and effectively comprises a series of forty-five trigger circuits arranged in the manner of a ring-counter so as to be turned-on, one after the other for the period of one digit-interval by the Dash waveform applied thereto. When thus turned-on, the particular single active trigger circuit allows the passage of the coincident Dash pulse to its associated output lead. The start of each counting cycle is initiated and is therefore kept in synchronism with the beat periods by use of the output from the divider circuit DV2 as a triggering medium.

The above described Blackout waveform of diagram (*b*), Fig. 2, is generated in a trigger circuit B0WG which is triggered to the condition providing a negative-going output voltage by the trailing edge of each *p*39-Pulse of the waveform of diagram (*e*), Fig. 2, and is reset to terminate the negative pulse period by the leading edge of each *p*0-Pulse of the waveform of diagram (*c*), Fig. 2.

The requisite line or X-scanning movement of the cathode-ray-tube beams to move sequentially over each of the forty digit storage locations of any one storage line on the tube screens is produced by saw-tooth deflection waveforms generated in the X-time base circuit XTB. This circuit is of conventional construction and is triggered to commence its linear run-down period by the trailing edge of each Blackout pulse and executes its flyback during such pulse. Paraphase outputs for push-pull deflection are provided in the usual way. One version of such X-Time Base waveform is shown in diagram (*k*), Fig. 2, and is repeated in diagram (*b*), Fig. 3, at a reduced time scale to show a plurality of successive beat periods.

Figure 3:
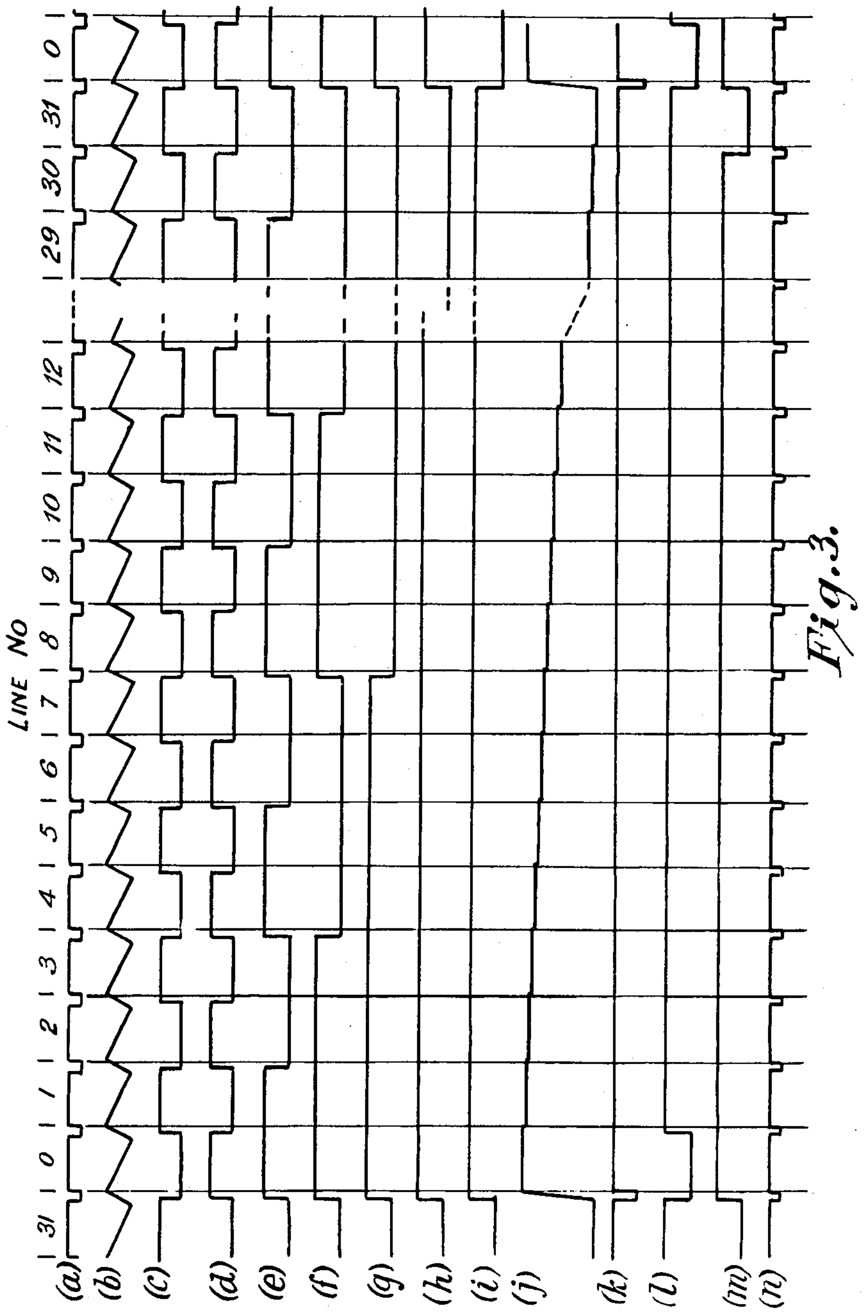

As described in the aforesaid specifications A, B and C the electrostatic storage tubes normally operate with an alternate Scan-Action beat rhythm, Scan beats being those in which regular and sequential regeneration of the contents of the store is effected and Action beats being those in which the content of any desired and selected store address is used for computation purposes. For defining this Scan-Action rhythm the Halver-S and Halver-A waveforms of diagrams (*c*) and (*d*), Fig. 3, are provided and are generated in a trigger circuit HWG which is reversed in its setting during each Blackout pulse. As will be seen from the diagrams referred to, the Halver-A waveform is negative-going during the active part of each alternate (Action) beat while the Halver-S waveform is negative-going during the intervening (Scan) beats.

For the purpose of controlling the sequential regeneration of the thirty-two storage lines of each storage tube, there are provided, as described in the aforesaid specifications A, B and C, a series of counter waveforms known as the C0, C1, C2, C3 and C4 waveforms shown in diagrams (*e*), (*f*), (*g*), (*h*) and (*i*) respectively of Fig. 3. The waveforms are derived from further trigger circuits C0WG, C1WG, C2WG, C3WG and C4WG, the first of which is reversed by each negative-going edge of the Halver-S waveform and the remainder of which are reversed by differentiated pulses derived from the circuit preceding it.

The various waveforms as described above and derived from the unit WGU are assumed to be available wherever required throughout the machine but in view of the complexity of diagram caused by any attempt to show each individual connection, the various waveform leads are assumed to be included in the multiple lead ***m*1**.

The normal computing operation of the store MS requires the provision of a Y-Shift or deflection waveform which causes the tube beam to scan each line in turn from line 0 to line 31 during a succession of Scan beats and to be aligned with any particular line (chosen by the Control Unit CL) during the intervening Action beats. The requisite stepped Y-Shift waveform is provided by the unit YSG shown associated with the store MS. This unit may be of the kind referred to in the aforesaid specifications A, B and C but for the purpose of the present invention, it will be assumed that such stepped action can be suspended when required and a sequential Y-Shift obtained to each of the thirty-two lines in turn, one in each of thirty-two successive beat periods, in the manner described in specification C. The resultant Y-Shift (M*s*) waveform is shown in diagram (*j*), Fig. 3.

In the machine as outlined above, the majority of the various instruction and number (data) items are held in the subsidiary store SS when a large computation is being carried out, blocks of such stored items being transferred temporarily into the main store MS and then back to the subsidiary store as the programme of operations progresses. Such an arrangement is advantageous in reducing the size and cost of the high-speed store. In many computing operations, reference is frequently required to statistical information, such as tables of constants, or the like and the provision of these within the subsidiary store greatly increases the capacity requirements thereof with accompanying increase of cost and complexity and with the added disadvantage, with most forms of subsidiary store, that the recording of the stored date may through accident, be altered or even destroyed.

In order to provide for such and similar requirements of a library facility, the card store arrangements of the aforesaid specification D, were devised whereby information in a permanent and visibly recorded form can be selected electrically by a digital code signal and read into the computing machine at the normal operating speed of the latter.

Figure 4:
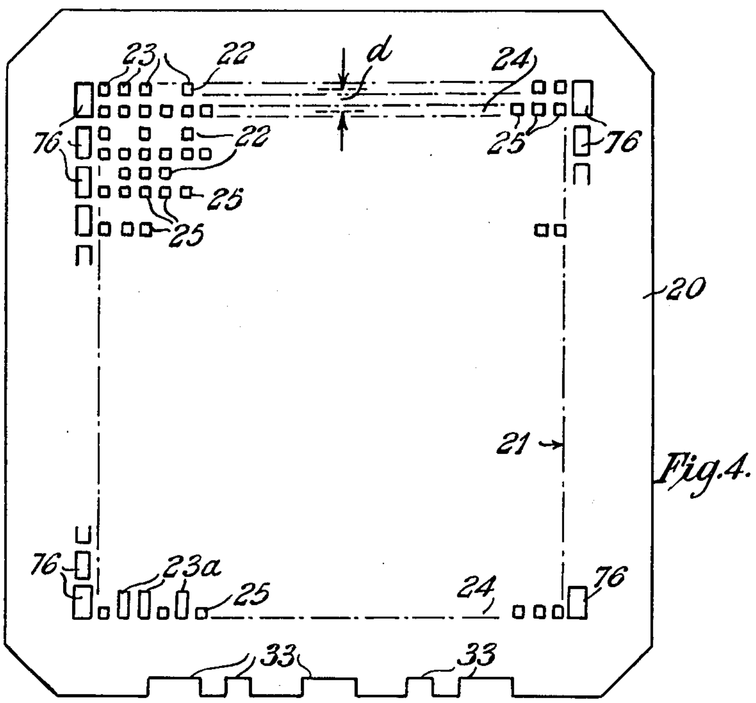
Fig. 4 shows a typical information-bearing card of the general kind described in the aforesaid specification D but modified for use in the present invention.

In such card type store, the various information or data items, each in the form of a forty-digit binary number, are recorded as rows of hole punchings in a rectangular card as shown in Fig. 4.

Each information-bearing card 20 is of thin opaque material such as thin metal sheet or plastic substance and is provided, within the field defined by the dotted line rectangle 21, with thirty-two horizontal rows 22 each of which has a total of forty equi-spaced positions for punched out holes as shown at 23. The presence of a punch hole at a given position indicates the presence of a binary "1" digit at a related position in a binary number whereas the absence of a punching at that position indicates the presence of a binary "0" digit at the related position of the number. The position of any punching along any row is indicative of the significance, in the binary scale, of the digit "1" which it is to represent. Each of these rows of holes therefore represents a forty-digit binary number and will hereinafter be referred to as an "intelligence" row. As there are thirty-two such intelligence rows, one card 20 holds one complete filling for a cathode-ray-tube store as already described in connection with the main store MS of Fig. 1*a*.

Immediately below each intelligence row 22, at a predetermined and constant spacing distance *d*, there is provided a further or "inspection" row 24 of holes 25. Whereas in the intelligence rows 22 holes are formed only where the binary digit "1" is to be signalled, in the rows 24 a hole is provided at every digit signifying position, immediately below the corresponding hole position in the rows 22. In the example shown there are accordingly a total of 32 inspection rows 24 each containing forty holes 25.

A considerable number, say 256, of the cards 20 are arranged in stacked formation to constitute a library unit and are disposed as shown at 26 in Fig. 6 in face to face and aligned edge relationship. When in such stacked relationship, all of the holes 25 in each inspection row 24 are in accurate alignment with their related holes of the remaining cards so that light may be transmitted from one end face of the stack 26 to the other through each of the passages formed by the aligned holes 25. There are thus 32×40, i. e. 1280 separate passages each capable of transmitting light through the stack.

In order to read the contents of the intelligence rows 22 on any one card 20, that card is merely displaced by the distance (*d*), Fig. 4, relatively to the remaining cards, whereupon such rows 22 become aligned with the aforesaid passages formed by the holes 25 in the remaining cards. Wherever a "1" digit is indicated in the related intelligence row 22, light will still be transmitted but where a "0" digit occurs there will be no punching in the appropriate position and the transmission of light through the passages of holes 25 will be blocked. Instead of providing separate hole punchings 23 for the intelligence rows, an equivalent effect can be obtained by extending the required "inspection" holes 25 to embrace the level of the adjacent row 22 as shown at 23*a*. For facilitating the selective movement of one information card 20 alone relatively to its neighbours the information cards are separated from one another by interleave cards 27 which are each of the form shown in Fig. 5. These interleave cards are of rectangular shape and conveniently of similar material to the information cards 20 and are each provided with thirty-two rows 28 of forty inspection holes 29 identical in their mutual spacing with those inspection holes 25 of the rows 24 within the field 21 of the information cards 20.

The device for holding the information and interleave cards and for effecting selection of any desired information card is shown in Figs. 6, 18, 19 and 20. The opposite vertical side edges 30 of the interleave cards 27 are snugly fitted within two stationary channel bars 31 as shown in Fig. 6. The transverse width of the information cards 20 is the same as that of the interleave cards whereby they also are accurately positioned in the lateral direction by the channel bars 31 but the cards 20 have each corner thereof chamfered as shown at 32 in order to allow upward and downward movement of the cards 20 relative to the interleave cards 27.

The lower horizontal edge of each of the information cards 20 is provided with a series of notches 33 as shown more clearly in Figs. 4 and 20 and these co-operate with a series of pairs of lifting plates 39, 40 arranged beneath the lowermost surface of the stack 26. The notches 33 are formed so as to present a gapped region opposite one or the other but not both of the lifting plates 39, 40 of each pair (see Fig. 20), there being eight pairs of lifting plates in the example shown.

Constructional details of the operating mechanism of the lifting plates 39, 40 are illustrated more clearly in Figs. 6, 18 and 19 from which it can be seen that each lifting plate 39 or 40 is in the form of a thin inverted U-shaped plate sliding vertically within an aperture 51 formed in a series of stacked laminae 52.

The laminae stack 52 comprises alternate whole plates 53 and interposed spacing strips 54, 55 along each vertical edge, the latter strips being slightly separated from each other at their adjacent ends to define a series of narrow gaps 56 through which pass thin wires 57. A series of middle plates 58 located within the central space of the U-shaped lifting plates 39, 40 provide a resting stop for each of the latter when their uppermost edges are flush with the upper surface of the laminae stack 52. The assemblage of laminae is held together by transverse rods or bolts 59 and, like the channel bars 31, is rigidly secured to the fixed framework of the device.

Immediately beneath the lowermost ends of each lifting plate 39, 40 is disposed a sliding abutment piece 60 in the form of a bar resting at its ends upon surfaces formed on the strips 55. Each abutment bar 60 is provided along its undersurface with a series of spaced slots 61 forming intervening projections 62. The wires 57 are connected to each end of each piece 60, the wires projecting from one side of the laminae stack 52 being anchored through tension springs 63 to a fixed part of the device and those projecting from the other side of the stack being coupled to the ends of pivoted armatures 64 of electro-magnets SR whose energising windings 65 are supplied with current under the control of the card select staticisor CSS, Fig. 1*b*, in a manner described later. Each armature 64 is connected to the two abutment pieces 60 which lie respectively beneath the related pair of lifting plates 39, 40 and which deal with one of the card selection code digits of the digital code signal applied over lead 100, Fig. 16, to the card select staticisor CSS.

As shown more clearly in Fig. 19, the respective abutment pieces 60 coupled to each armature 64 are displaced longitudinally with respect to each other by the distance $\alpha$ so that the notches 61 of one piece lie opposite the projections 62 of the other and vice versa.

Operating in a channel 66 in the undersurface of the laminae stack 52 is a driving stirrup 67 whose upper surface is ribbed to provide a series of projections 68 suitably shaped and spaced to enter into the notches 61 of any piece 60 when the latter is appropriately placed thereover. This stirrup is rigidly coupled to the upper end of a main driving rod 36 so as to be reciprocated up and down by the latter at appropriate card selecting and reading times as described later.

Owing to the longitudinal staggering of the respective notches 61 of the pair of abutment pieces 60 associated with each armature 64, only one of such pieces 60 can be positioned at any one time so that the slots 61 thereof lie opposite the projections 68 of the stirrup 67 with the result that, when the relay magnet SR of any pair of lifting plates 39, 40 is de-energised, the abutment piece 60 beneath the associated lifting plate 39 will be lifted to raise such plate. If, on the other hand, any relay magnet SR is energised, then the other piece 60 beneath the lifting plate 40 of the related pair of lifting plates will be lifted to raise such plate 40 instead of the plate 39. The sloping lower edges 69 of the strips 54 permit the necessary flexing of the wires 57.

In order to relieve the relay magnets SR of the task of moving both abutment pieces 60 against the tension of the springs 63, each armature 64 is provided with a tail 70 which is engageable by one end of a pivoted two-armed lever 71 whose opposite limb is operated upon by a striking plate 72 secured to the stirrup 67 when the latter is in its lower, inactive, position prior to card selection and reading, all the armatures are mechanically moved into contact with their respective magnets. Energisation of the appropriate relay magnets SR in accordance with the binary code number of the required card is arranged to take place before the commencement of upward movement of the stirrup 67 so that only the armature 64 of those magnets SR which are still de-energised fall back to cause raising of the lifting plates 39, the energised magnets SR serving to hold their related armatures and thereby to cause lifting of the lifting plate 40.

The select mechanism SM comprising the lifting plates 39, 40 with their associated abutment pieces 60 controlled by the select relay magnets SR as above described, is controlled by a code signal supplied over lead 100 from the main store MS of the associated computing machine in the following manner. The applied control signal is in the form of a serial pulse train representing the binary number of the required card by the present of a pulse signal in each of those successive digit time intervals where binary value "1" is required to be signalled and by the absence of such a pulse in each of such digit time intervals where binary value "0" is required to be signalled. In the present example, where 256 cards are to be selected from, 8 binary digits are used, one for controlling each of the eight select relay magnets SR.

Such control signal is applied to a staticisor device CSS which is of conventional form comprising, for instance, and as described in detail in specification B, a series of two-stable state trigger circuits, each supplied at its triggering input terminal with the control signal train through an individual coincidence gate circuit which is opened only during a particular one of the digit time intervals of the applied pulse train whereby each trigger circuit is set up in accordance with the binary value of a different digit interval of the pulse train, the trigger circuit being triggered on (to represent binary value "1") if a pulse is present in the related digit time interval of the control signal and being left in its unset or off state if no such pulse is present. Thus if card numbered 105 is required, the control signal will comprise the digit signal group 10010110 (read from left to right) and only the first, fourth, sixth and seventh trigger circuits of the group of eight such circuits will be triggered on. Each trigger circuit controls the energisation of the related one of the select relay magnets SR, the magnet being energised when the trigger circuit is on and de-energised when it is off. In consequence, the abutment pieces 60 will be so arranged that, upon upward movement of the stirrup 67, the lifting plates 40 associated with the first, fourth, sixth and seventh magnets SR will be raised whereas the lifting plates 39 associated with the remaining (de-energised) second, third, fifth and eighth magnets will be raised. This particular combination is shown in Fig. 20. The staticisor CSS contains a further trigger circuit or equivalent section, controlled by a further pulse signal of the control signal train, to effect enerisation of a clutch device CH which serves to couple the rod 36 to a motor driven reciprocating mechanism MRM whereby the latter can be kept running continuously in a state of readiness but is ineffective upon the card select mechanism SM until specifically called upon by the arrival of the control signal on lead 100.

When the selected lifting plates 39, 40 are raised all but one of the information cards 20 will be lifted also since every card has a different formation of notches 33 along its lower edge and only one card will have a formation coinciding precisely with the raised plates 39, 40. In consequence this single selected card will undergo a displacement, relatively to the remaining cards by the distance *d*, Fig. 4, whereby its intelligence rows 22 will be aligned with the inspection rows 24 of the remaining cards. The inspection rows 28 of the interleave cards 27 are so positioned that they, also, are in alignment with the inspection rows of the displaced cards 20. The intelligence rows of the selected card 20 can thus now be read in the manner described.

After reading has been completed, the stirrup plate 67, is moved downwardly again to lower the plates 39, 40. At the same time a bar 50 disposed along the top of the card stack and coupled to the plate 67 by U-stirrup 73 presses all the displaced cards 20 back to their normal lowered level.

Figure 1B:
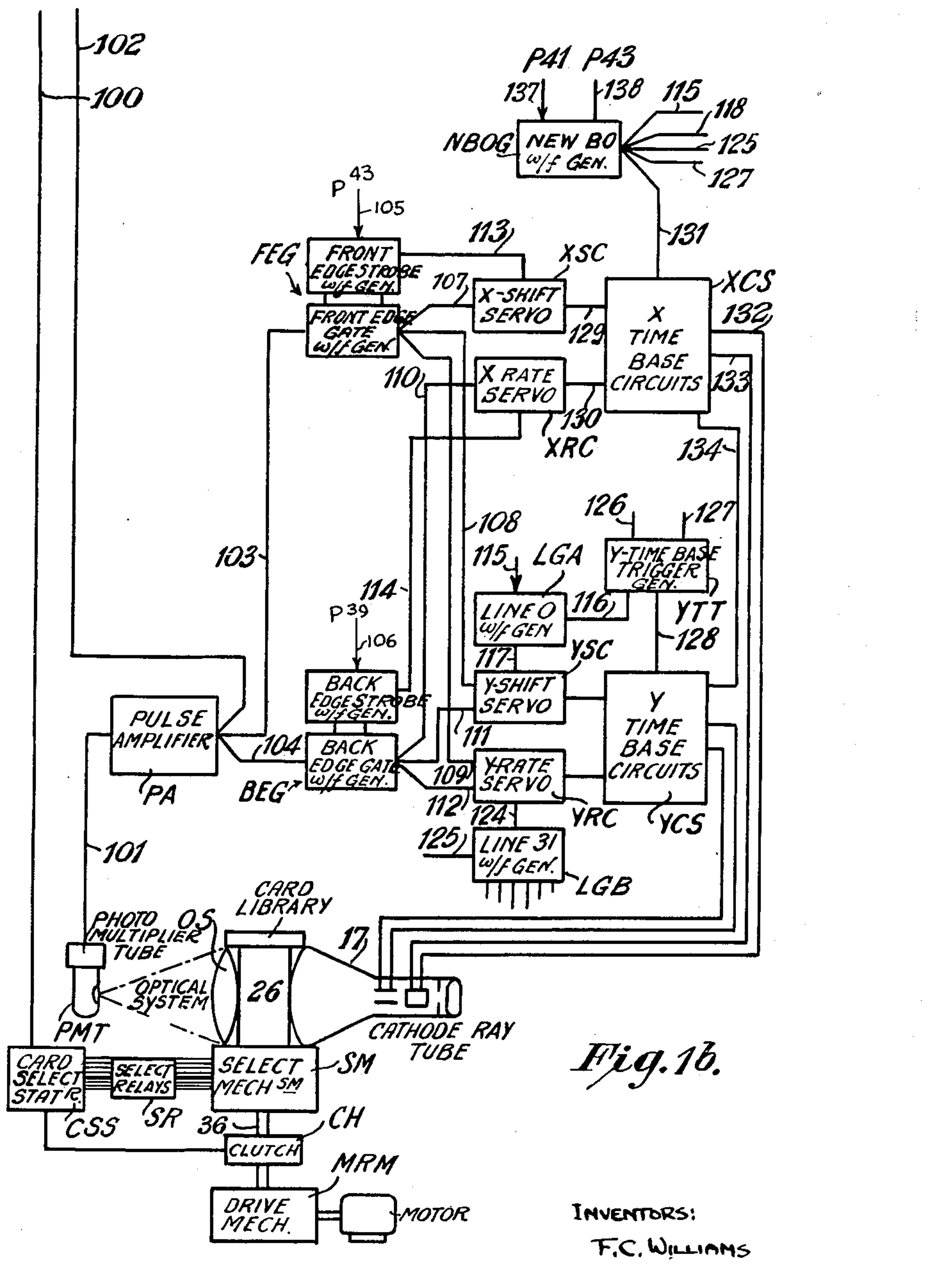

Referring now to Fig. 1*b*, which shows the card library arrangements in schematic form, the stack 26 has one end face associated with a cathode-ray-tube 17 for providing upon its screen a light spot which is moved along a television type raster whereby it is aligned to turn with each of the passages formed in the card stack by the inspection holes 25 and 29 when the cards 20 are in the "card-selected" position. At the opposite end face of the stack is provided an optical system OS which focuses any light transmitted through the stack onto a photo-multiplier tube PMT.

When the desired information card is in the selected position the beam of the cathode-ray-tube 17 executes its raster scanning motion whereby the presence of any "1" digit holes in the selected card 20 is signalled by the passage of light through the related inspection passages in the card stack and the production of output current pulses from the photo-multiplier tube PMT. The requisite scanning motion of the beam of the tube 17 is produced by X- and Y-time base circuits XCS and YCS.

As the pulse signal output from the photo-multiplier tube 22 is required to be fed, after passage through amplifier PA, directly into the main store MS of the associated computing machine, it will be evident that the position of the light spot produced by the tube 17 must be most accurately controlled at all times so that it is in register with each digit position of each row of holes in turn in precise synchronism with the time of the particular digit-interval, in the operating rhythm of the machine, which is related to that digit-position and that number row. For example, during the *p*7 digit-interval of the 5th beat of the machine during the reading operation, the light spot on the screen of the tube 17 must be opposite the eighth digit passage from the left in the fifth row from the top of the card.

In order to effect the required synchronisation the X- and Y-time base circuits XCS and YCS are associated with servo-control means about to be described and these, in turn, co-operate with additional holes placed in front of the first digit position and behind the last digit position of each of the thirty-two information and inspection rows of holes in the cards.

As will be seen from Fig. 5, the additional holes 70, 71 at opposite ends of the second to thirty-first rows (hereinafter, for convenience, referred to as Lines 1 to 30) are of similar, rectangular, form to those of the remaining holes of each row but the additional holes 72, 73, 74, 75 at opposite ends of the first and last rows ("Line 0" and "Line 31") are of triangular shape with the rear end hole 73 of Line 0 inverted relative to the hole 72 and with the front end hole 74 of Line 31 inverted relative to its related end hole 75 and also to the hole 72 of Line 0.

Figure 5:
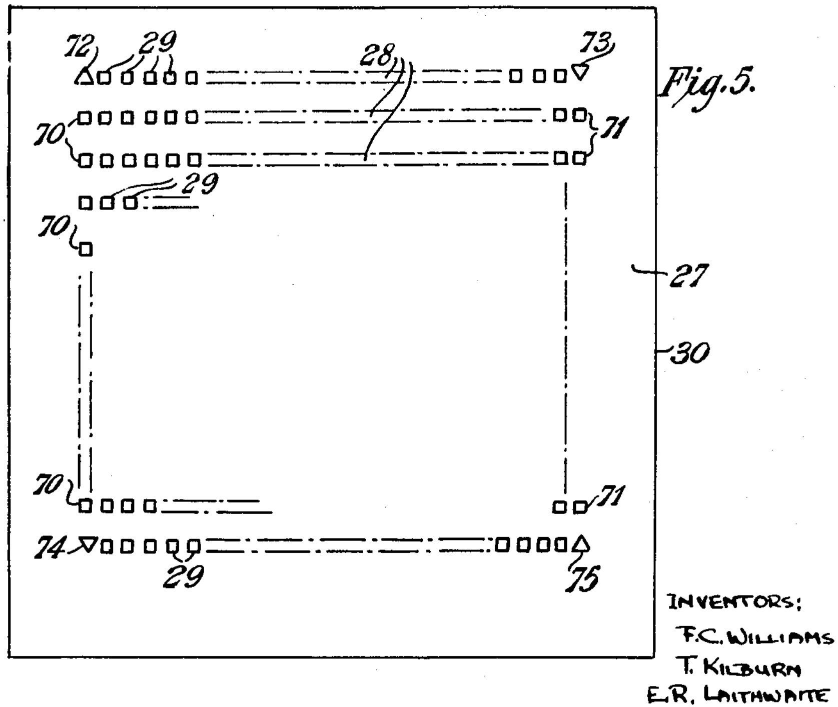
Fig. 5 is a view, similar to Fig. 4, of an interleave card also as described generally in the aforesaid specification D but modified for use in the present invention.

Light is transmitted through the passages formed in the card stack by these additional holes at all times and, for convenience, the special shaping shown in Fig. 5 is effected only to those holes formed in the interleave card 27 lying nearest to the screen of the tube 17. The remaining cards have holes 76 which are suitably enlarged to avoid any obstruction of the additional holes 70–75 in any displacement position of the information cards relative to the interleave cards.

Figure 7:
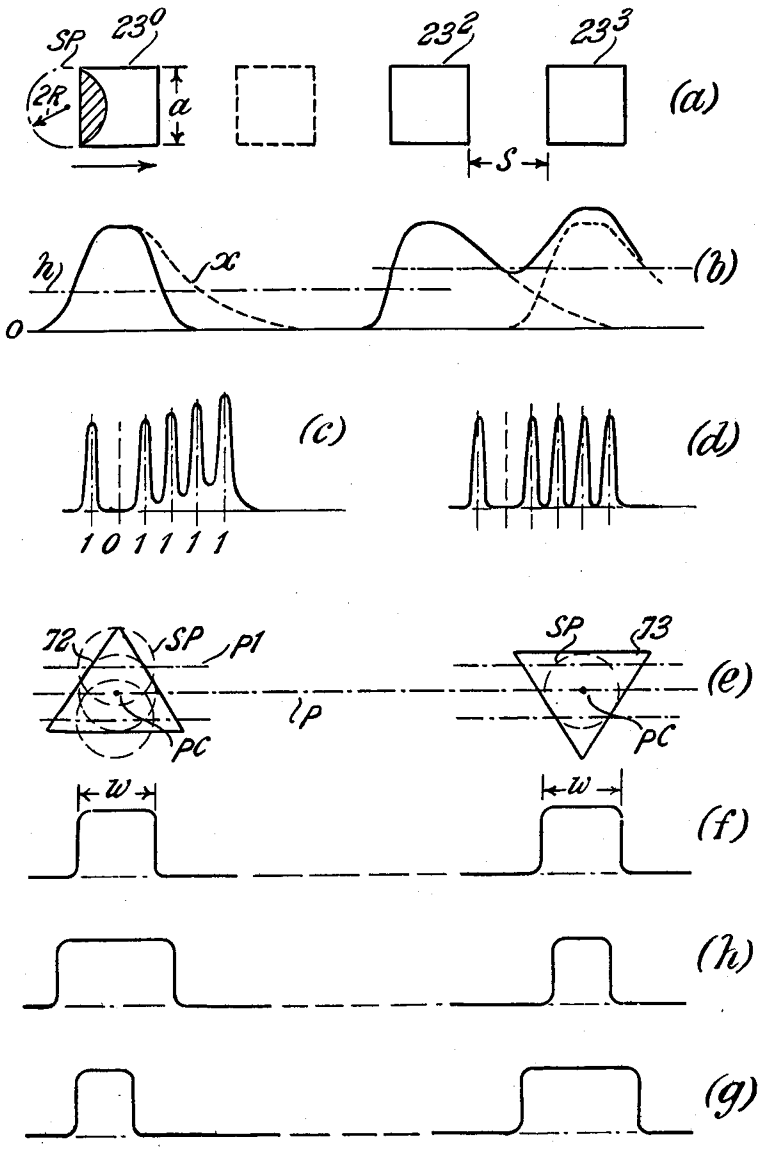
Fig. 7 is a series of diagrams relating to the form of output pulse obtained with different hole shapes and sizes.

Referring now to the diagrams of Fig. 7, that marked (*a*) indicates four successive digit positions in an intelligence row of which the first, third and fourth are punched at $23^0$, $23^2$, $23^3$ and the second is left unpunched. The circle SP indicates the light spot produced by the cathode-ray-beam upon the tube screen and is assumed to have a diameter 2R equal to the side dimension *a* of the square holes 23. If the light spot is caused to move past the first hole $23^0$ the output current from the phototube PMT, Fig. 1*b*, is theoretically, substantially proportional to the exposed area of the spot and can be represented by the full line graph curve of diagram (*b*).

It will be observed that the total width of the output (light) pulse is appreciably greater than that of the hole and is, in fact equal to $a+2R$. For reason of efficient use of the light available and to permit making the holes of minimum size, it is desirable to make the light spot diameter 2R approximately equal to the hole dimension *a* but this will obviously set a minimum dimension to the spacing distance *s* between adjacent holes in adjoining digit positions otherwise the output current will not fall to zero between pulses.

In practice, the existence of some degree of "afterglow" or persistence of excitation in the phosphor of the tube screen, causes the output current pulse for a single and isolated hole to have the distorted, i. e. extended trailing edge as shown at *x* in diagram (*b*), Fig. 7, with the result that, when several successive digit positions each have holes and the spacing distance *s* is not sufficiently great, the output current waveform exhibits what is termed "baseline shift" as indicated in diagram ($b$) beneath holes $23^2$ and $23^3$ of diagram ($a$). Diagram ($c$) illustrates a typical oscillogram for the output of punchings representing the binary number 101111.

In order that "noise" voltages and other similar circuit disturbances shall not cause the insertion of spurious "1" digit signals in the output of the card reading operation, it is necessary to set a minimum threshold level $h$, diagram ($b$), below which the output voltage from the amplifier PA (Fig. 1$b$) is zero. If "baseline shift" is allowed to occur the setting of this level $h$ to ensure proper separation of the output pulses will necessarily be high and may become impossibly so. In any case the useful portion of the output current pulse will be restricted.

To overcome these difficulties the pulse amplifier PA is provided with means for correcting "baseline shift" whereby the output oscillogram of diagram ($c$) is converted to one as shown in diagram ($d$).

In the case of the special triangular corner holes 72, 73, 74 and 75, Fig. 5, the effect of misalignment of the scanning level of the light spot is illustrated in diagrams ($e$), ($f$), ($g$) and ($h$), Fig. 7. In diagram ($e$) are represented holes such as those of 72 and 73 at opposite ends of the first row (Line 0). The dimension of the holes are so adjusted that when the light spot SP is correctly aligned with its centre moving along a path $p$ passing through the centre points $pc$ of each hole, the output pulses (after suitable magnification and shaping in the amplifier PA) have a form as indicated in diagram ($f$) where their respective widths $w$ are equal and similar to those obtained with a normal square hole as in diagram ($a$), Fig. 7.

If, however, the path of the centre of the light spot SP is above the centre points $pc$ of the holes as indicated at $p1$ in diagram ($e$) then the respective output pulse widths are unequal, that from the first hole being smaller than that from the second hole as shown in diagram ($g$). If, on the other hand, the path of the light spot is below the centres $pc$ then the pulse width are again unequal but in the opposing sense as shown in diagram ($h$). Similar considerations apply to the holes 74, 75 of the lowest row (Line 31) except that the variations are inverse to those described above in view of the reversed disposition of the holes.

The means for effecting the requisite accurate control of the scanning movement of the cathode-ray-tube beam, utilising the above described additional holes at each end of each row, will now be described in detail.

Figure 8:
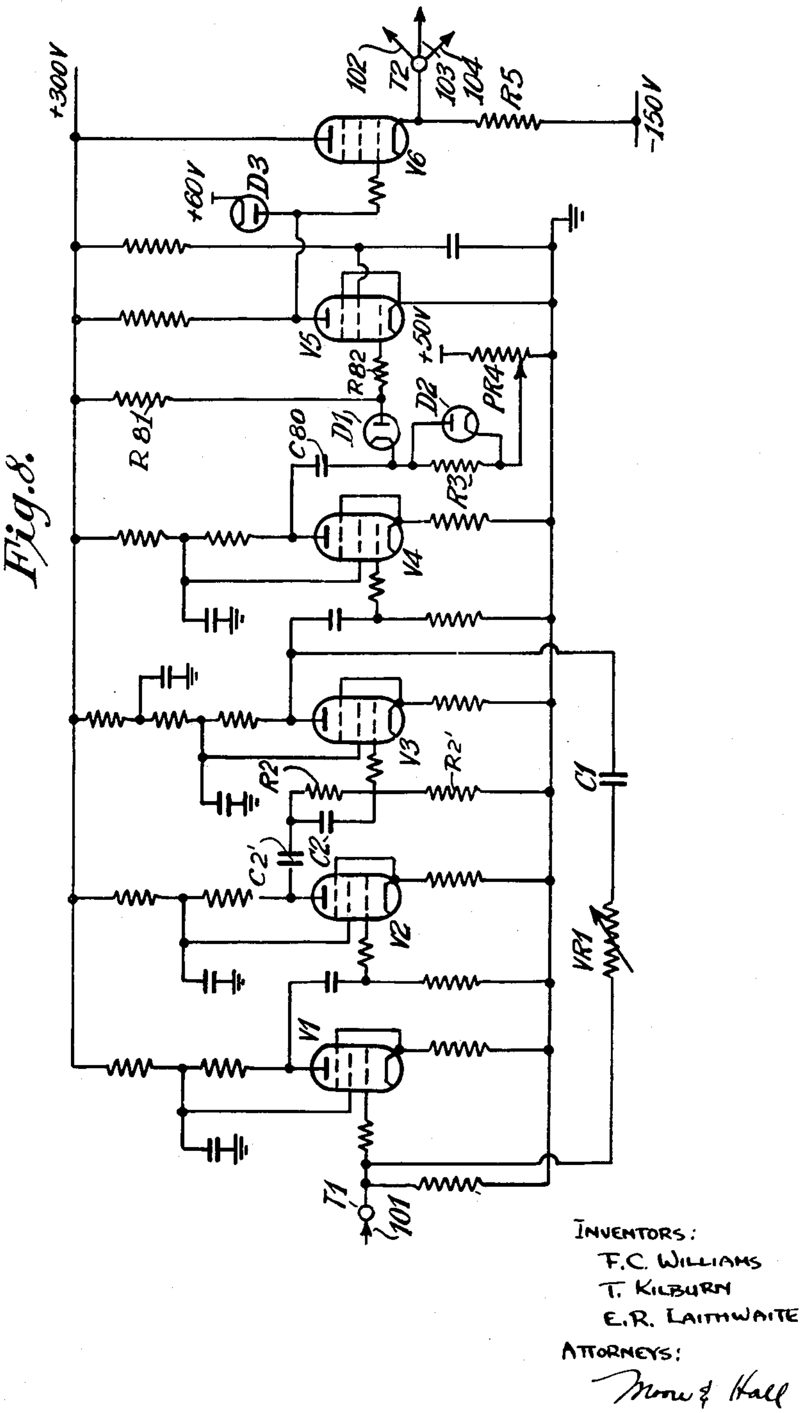
Fig. 8 is a circuit diagram of the pulse amplifier receiving the output from the optical viewing means and providing the requisite signals for use in the associated computing machine and in the servo-control elements.

The circuit of the pulse amplifier PA of Fig. 1$b$ is shown in Fig. 8. This amplifier accepts the output from the photo-multiplier tube PMT and provides a much amplied and rectangular shaped pulse output for use as a signal within the computing machine and also for controlling the X- and Y-time base servo mechanism for the tube 17.

The output from the photomultiplier tube PMT, in the form of negative-going pulses, is applied through lead 101 and terminal T1 to an amplifier network consisting of valves V1, V2, V3 arranged as an anode-follower type circuit with a feedback path from the anode of valve V3 through condenser C1 and variable resistance VR1, which acts as a gain control, to the control grid of valve V1.

For the purpose of correcting the previously described baseline shift and distortion in the photomultiplier tube output a capacitor C2 (33 micro-microfarads) is shunted across the resistor R2 (470 kilo-ohms) forming part of the resistance/capacitance coupling network of capacitor $C2^1$ (470 micro-microfarads), resistor R2 and resistor $R2^1$ (3 kilo-ohms) between the anode of valve V2 and the control grid of valve V3. The presence of such shunting condenser effectively provides a degree of phase-advancement to the transmission characteristics of the coupling which serves to increase the rate of rise and fall of the input pulse waveform and thereby, in its effect upon the trailing edge of each pulse, to ensure the return of the control grid potential of valve V3 to its normal resting or baseline level between pulses. In other respects the circuit arrangement of these first three valves is conventional and will therefore not be described in detail.

The positive-going pulse output from the anode of valve V3 is then applied to a further amplifying and inverting valve V4 whose negative-going pulse output is applied to a limiter stage comprising valve V5. This valve has its control grid connected by way of grid-stopper resistor R82 (330 ohms) and resistor R81 (470 kilo-ohms) to the source of positive potential +300 v. whereas its cathode is directly connected to earth. In consequence the junction point between resistors R81 and R82 can rise only slightly above earth potential. The output from the anode of valve V4, in the form of negative-going pulses, is applied to this junction point through diode D1. The cathode of this diode D1 is, however, also connected by way of resistor R3 (47 kilo-ohms), shunted by further diode D2, to an adjustable tapping on potentiometer PR4 (50 kilo-ohms) connected between earth and a source of positive potential +50 v. According to the setting of potentiometer PR4 so the cathode of diode D1 may be biased positively with respect to its anode by any desired potential between 0 and 50 volts and this amplitude of negative-going pulse output from valve V4 must be exceeded before diode D1 will conduct to apply a negative-going input voltage to the control grid of valve V5. The setting of this poteniometer provides an adjustment of the lower limiting level below which input signals will not be passed to the valve V5 and hence this control effectively sets the level $h$ referred to in connection with diagram ($b$), Fig. 7, and to be regarded as the minimum input signal acceptable as indicating a "1" digit. The diode D2 across resistor R3 effectively short circuits the resistor R3 during the time of the positive going trailing edge of the applied pulse from valve V4 thereby assisting in the rapid recovery of the circuit conditions to their normal values and ensuring the rapid termination of the output pulse from valve V5 to prevent possible base line shift.

The positive-going output at the anode of valve V5 is squared by means of a clipping diode D3 having its cathode returned to a suitable positive potential, +60 v., whereby the uppermost peak of each pulse is limited at that value. The resultant squared pulse output is applied to the control grid of valve V6 which is arranged as a cathode follower. The output waveform developed across its load resistance R5 is fed to the output terminal T2. This terminal supplies lead 102 feeding the main store MS of the computing machine, and leads 103, 104 feeding respectively the front and back edge strobe and gate pulse circuits FEG and BEG of Figs. 1$b$ and 9. A typical output waveform consisting of rectangular pulses, positive-going from an earth resting level, and as available from terminal T2 under ideal, i. e. properly synchronised and aligned conditions, is shown in diagram ($l$), Fig. 2.

As already described and shown in diagram ($b$) Fig. 2, the Blackout waveform of the associated machine has an operative, i. e. negative-going, period between the end of the $p39$ Dash pulse and the commencement of the first, $p0$, Dash pulse of the next following beat. Such a waveform cannot be used for controlling the cathode-ray-tube 17 since it is now necessary for the tube beam to deal with the additional columns of holes provided at the front and rear ends of the 40-digit information and inspection rows. It is therefore necessary to generate a New B. O. waveform as shown in diagram ($m$), Fig. 2, in which the blackout pulse period is shortened at each end to exclude the digit intervals $p40$ and $p44$ required for such extra columns.

Figure 9:
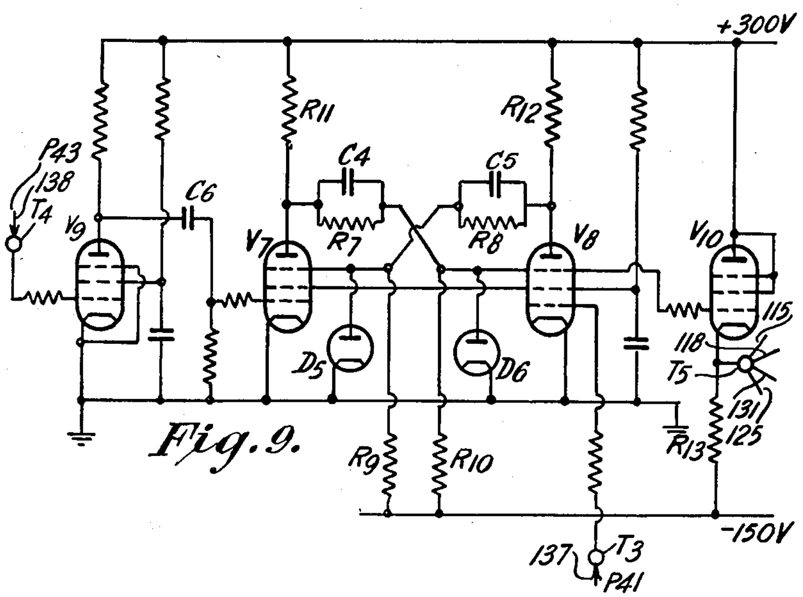
Fig. 9 is a circuit diagram of a waveform generator for providing a modified blackout or New B. O. waveform.

This waveform is generated by the circuit shown in Fig. 9 and which comprises a flip-flop trigger circuit of pentode valves V7, V8 cross-connected between their anodes and suppressor grids through respective networks of resistor R7 with parallel condenser C4 and resistor R8 with parallel condenser C5. The suppressor grid of each valve is taken to a negative potential source, —150 v., through leak resistor R9 or R10 while the potential excursion of such suppressor grids in the positive direction is limited at earth potential by diodes D5 and D6. The valves V7 and V8 are provided with anode load resistors R11 and R12 taken to a positive anode potential source, +300 v. The control grid of valve V8 is connected to terminal T3 to which is applied, over lead 137, the *p*41-Pulse waveform (diagram (*g*), Fig. 2). The control grid of the opposite valve V7 is coupled to the anode of valve V9 through condenser C6. This valve V9 has its control grid connected to terminal T4 to which is applied, over lead 138, the *p*43-Pulse waveform, diagram (*i*), Fig. 2. The suppressor grid of valve V8 is also connected to the control grid of a cathode follower valve V10 whose cathode load resistor R13 is taken to a negative potential source, —150 v. The cathode of this valve, which provides the required New B. O. waveform, is connected to terminal T5. This terminal feeds leads 115, 118, 125 and 131.

In the operation of this arrangement, the *p*41-Pulse waveform applied to terminal T3 and the control grid of valve V8 cuts this valve off at the commencement of the *p*41 digit interval. The resultant rise of anode potential of the valve is communicated to the suppressor grid of the opposite valve V7 which is accordingly turned-on to produce anode current flow and the resultant fall of its anode potential is communicated back to the suppressor grid of valve V8 to drive the latter negatively and so cut off the valve at its suppressor grid regardless of whether the control grid of the same valve is later turned on, as it will be, at the end of the *p*41-Pulse. This depression of suppressor grid potential of valve V8 is fed also to the cathode follower valve V10 to provide a corresponding negative-going output pulse commencing in coincidence with the commencement of the *p*41-Pulse.

This state of affairs continues until, by the application of the *p*43-Pulse waveform to terminal T4 and valve V9, that valve, which is normally conductive, becomes suddenly cut off at its control grid. The resultant anode voltage rise causes the transmission of a positive-going differentiated peak through condenser C6 to valve V7 which is, however, already turned on. The positive pulse is therefore ineffective. At the end of the *p*43-Pulse the positive-going edge of the pulse again turns the valve V9 on and produces a negative-going differentiated pulse through condenser C6 which cuts off valve V7 at its control grid. This produces a potential rise at the anode of valve V7 and this is communicated to the suppressor grid of the opposite valve V8 to allow anode current flow to recommence thereby producing a fall of anode potential which holds the suppressor grid of valve V7 cut off regardless of the subsequent turning-on of that particular valve by the gradual rise of its control-grid potential. This condition, with valve V8 conducting to both screen grid and anode and valve V7 conducting to its screen grid alone persists until the arrival of the next *p*41-Pulse at the end of the next beat. Upon the aforesaid rise of the potential of suppressor grid of valve V8 the control grid of the cathode follower valve V10 is similarly driven positive with resultant positive rise of the output at terminal T5 to form the required New B. O. waveform shown in diagram (*m*), Fig. 2.

Figure 10:
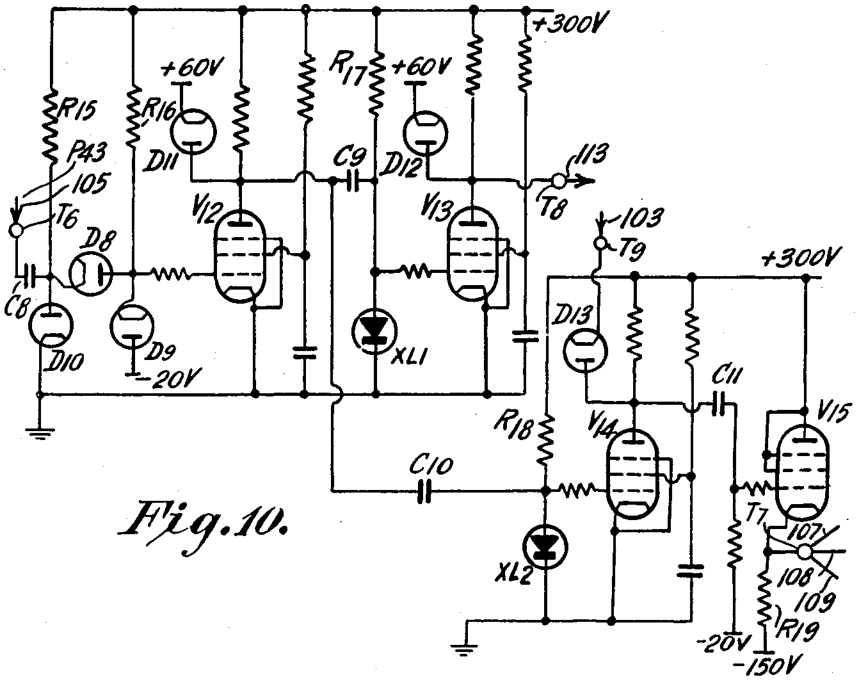
Fig. 10 is a circuit diagram of one of two composite waveform generators for providing the Front- and Back-Edge Strobe waveforms and for effecting gating of the Front- and Back-Edge light pulses.

As will be described later in connection with the servo-control of the time-base circuits it is necessary to separate or gate the signal pulses derived from the additional front and back holes of each row and to provide marker or strobe pulses of accurate length and timing which are effectively split into two portions by the front edges of the gated light pulses. The requisite waveforms are shown in diagrams (*n*), (*o*), (*p*) and (*q*), Fig. 2. The arrangements FEG for generating the Front Edge Strobe waveform of digram (*n*) and the Front Edge Gate waveform of diagram (*p*) are shown in Fig. 10.

In this arrangement the *p*41-Pulse waveform of diagram (*i*), Fig. 2, is applied over lead 105 to terminal T6 and is fed by way of condenser C8 to the network of diodes D8, D9, D10 and resistors R15, R16. The resistors R15, R16 are returned to a source of positive potential, +300 v., while the anode of diode D9 is returned to a negative source of potential —20 v. The junction point of the cathode of diode D9, anode of diode D8 and the resistor R16 is connected to the control grid of valve V12. Diodes D8 and D10 in series effectively prevent the control grid of valve V12 rising appreciably above earth in spite of the connection of such control grid to the source of positive potential +300 v. so that valve V12 is normally fully turned on and its anode potential is accordingly low. Upon arrival of the negative-going *p*43-Pulse, the control grid of valve V12 is lowered to —20 v., at which level it is caught by the diode D9. The anode potential of valve V12 accordingly rises to the level of +60 v. at which it is caught by the diode D11. The self-capacity of the grid circuit of valve V12 is thus charged and the valve is held cut-off, even when the input *p*43-Pulse terminates, due to the action of diode D8, and is not turned on again until the negative charge is dissipated through resistor R16. This turning-on action is arranged to take place 8 microseconds after the time of arrival of the front edge of the aforesaid *p*43-Pulse. When it occurs the anode voltage of valve V12, falls again so that a positive-going pulse of 8 microseconds' duration from the leading edge of the *p*43-Pulse is generated.

The anode of valve V12 is coupled to the control grid of valve V13 through condenser C9 and to the control grid of valve V14 through condenser CIO. The control grid of valve V13 is returned to the positive potential source, +300 v., through resistor R17 and is also connected to the anode terminal of a crystal diode XL1 whose other terminal is earthed. The control grid of valve V14 is likewise returned to the positive potential source, +300 v., through resistor R18 and also connected to the anode terminal of a crystal diode XL2 whose other terminal is earthed. These crystal diodes XL1 and XL2 operate as clamping diodes to prevent the control grids of valves V13, V14 respectively rising above earth potential.

The initial positive swing of the anode of valve VL2 to its limited upper value of +60 v. is ineffective upon either of the control-grids of valves V13, V14 since both valves are normally fully conducting but the subsequent fall of anode voltage of valve V12 as the centrol grid potential of the latter rises again eight microseconds later provides a negative-going swing which cuts off both valves V13 and V14.

The time constant of condenser C9 and resistor R17 is such that valve V13 becomes turned on again five microseconds after being cut off whereby the resultant output at the anode of valve V13, consists of a square positive pulse commencing eight-microseconds after the leading edge of the initiating *p*43-Pulse and lasting for five microseconds. This forms the Front Edge Strobe waveform of diagram (*n*) Fig. 2. This waveform is supplied through terminal T8 and lead 113 to the X-Shift servo circuit XSC.

In similar manner the time constant of condenser C10 and resistor R18 is such that valve V14 is turned on again ten microseconds after being turned off whereby its anode output consists of a square positive pulse, as shown in diagram (*p*), Fig. 2, commencing eight microseconds after the leading edge of the initiating *p*43-Pulse and persisting for a total time period of ten microseconds and thus forming the Front Edge Gate waveform.

The catching potential for the cathode of diode D13 is supplied through terminal T9 and lead 103 from the output terminal T2 of the pulse amplifier circuit PA.

As shown in diagram (*l*), Fig. 2, this output consists of positive going light pulses from a resting level of approximately earth potential. In consequence, the catching level of the diode D13 is raised sufficiently to provide an output from the anode of valve V14 only when a "1" representing light pulse is present during the gate period and the effective, positive-going pulses fed through condenser C11 to the control grid of valve V15 are those of the selected light pulses, i. e. the pulses derived from the additional holes 70, 72 or 74 in the rows of the card store. Valve V15 is arranged as a cathode follower and the cathode output of this valve, consisting of the gated Front Edge light pulses as shown in diagram (*r*), Fig. 2, developed across load resistor R19, is fed to terminal T7 and thence by way of leads 107, 108 and 109 to the X-Shift, Y-Shift and Y-Rate servo circuits XSC, YSC and YRC respectively.

The arrangements BEG for generating the Back Edge Strobe and Back Edge Gate waveforms of diagrams (*o*) and (*q*) Fig. 2, are substantially identical with those described above except that terminal T6 is supplied with the *p*39-Pulse waveform by way of lead 106. The terminal T8 then provides the Back Edge Strobe waveform to lead 114 and terminal T7 the gated Back Edge light pulses of diagram (*s*), Fig. 2, to leads 110, 111 and 112.

Figure 11:
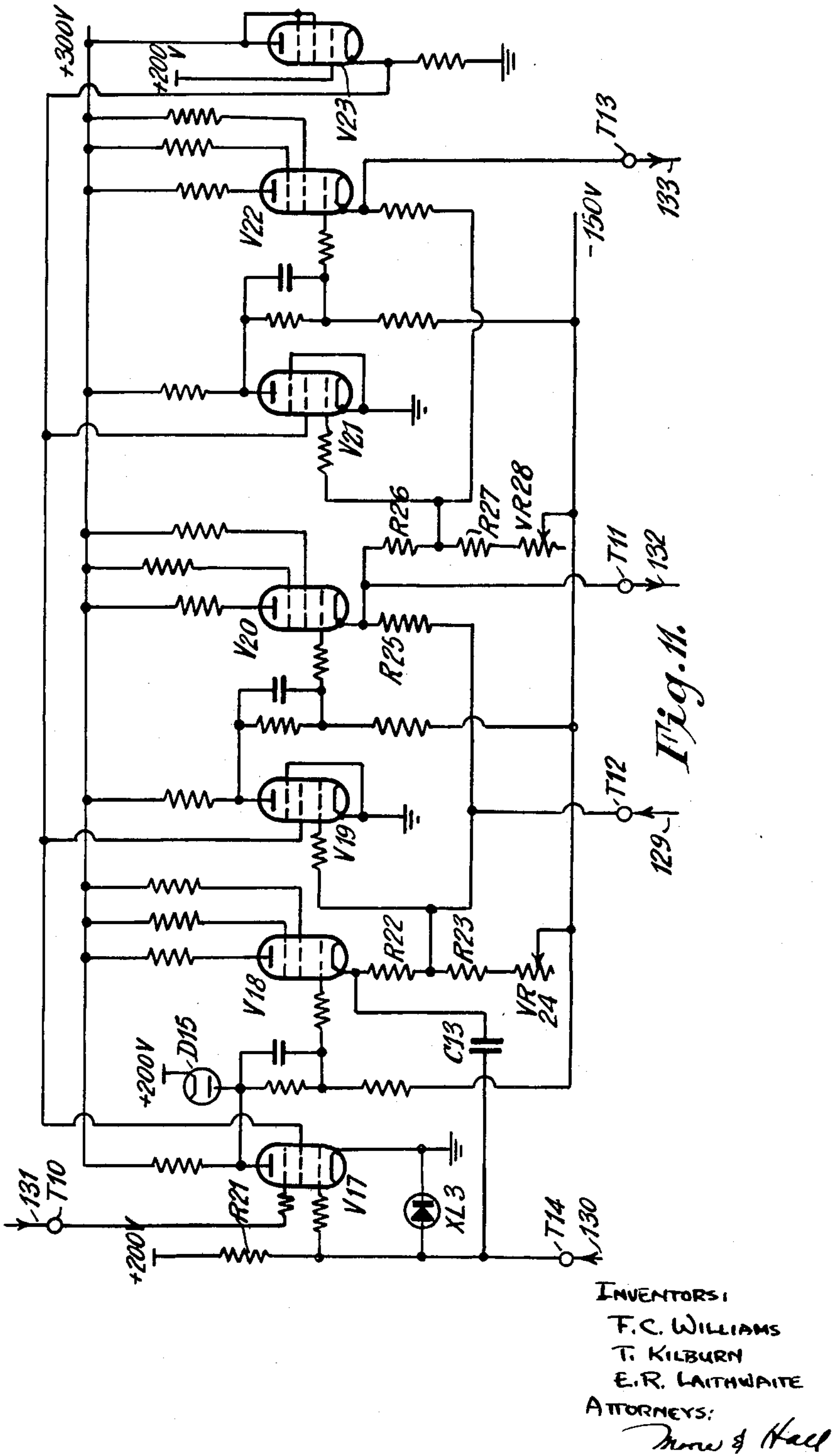
Fig. 11 is a circuit diagram of the X-time base circuits associated with the cathode-ray-tube providing the moving light spot.

The circuit of the X-time base unit XCS, Fig. 1*b*, is shown in Fig. 11 and comprises a time base arrangement of valves V17, V18, diode D15, crystal diode XL3 and other circuit components utilising the well-known "Miller feedback" principle as described, for instance, in M. I. T. Radiation Laboratory Series, vol. 19 (published 1949 by McGraw-Hill), page 37, and vol. 21 (published 1948, by McGraw-Hill), page 80—see particularly Fig. 4.24. Valve V17 is the normal Miller run-down valve and is controlled by the application of the New B. O. waveform, diagram (*m*), Fig. 2, to its suppressor grid through lead 131 and terminal T10. The valve V18 is a cathode follower stage inserted in the Miller feed back path through condenser C13 between the anode and control grid of valve V17. In the normal manner, the run-down time is governed by the values of condenser C13 and leak resistor R21 which is returned to a source of positive potential, +200 v. The junction between condenser C13 and resistor R21 is also connected to terminal T14 through which current from the X-Rate servo-control arrangements may be supplied to the condenser C13 over lead 130. The crystal diode XL3 operates as a clamp to prevent the control grid of valve V17 from rising above earth potential.

Ignoring, for the present, any servo control influences, the operation follows the normal course, valve V17 being cut-off during the negative pulse period of the New B. O. waveform to perform its fly-back operation and being turned-on at the instant of occurrence of the trailing edge of the *p*43-Pulse of the computing machine rhythm by the positive-going edge of the New B. O. waveform. The usual Miller run-down action then takes place until valve V17 is again cut-off at the leading-edge of the following *p*41-Pulse of the machine rhythm.

The cathode load of valve V18 consists of the series-connected network of resistors R22, R23 and variable resistor VR24 and the output saw-tooth voltage waveform available at the junction between resistors R22, R23 is applied to the control-grid of an amplifier valve V19 which is arranged in an anode-follower type circuit using a cathode-follower valve V20 in the negative feedback path between the anode and control-grid of valve V19. The cathode of valve V20 is connected to terminal T11 by which, through lead 132, one of two, push-pull, deflection waveforms is supplied to the X-deflection plates of the cathode-ray-tube 17. The feedback connection from the cathode of valve V20 is through resistor R25 to the control-grid of valve V19. The control-grid end of resistor R25 is also connected to terminal T12 by which X-Shift servo-control voltages may be applied.

The opposite phase version of the X-deflection waveform is obtained in the paraphase stage of valves V21, V22, which are substantially identical with valves V19, V20 in their arrangement as an anode-follower type circuit with the cathode output of valve V22 applied through terminal T13 and lead 133 to the other X-deflection plate of the cathode-ray-tube 17. The input to valve V21 is derived from the junction between resistors R26, R27 of the cathode load of valve V20.

The cathode load of valve V20 which includes the network of resistors R26, R27 and variable resistor VR28, resembles the arrangement of the cathode load of valve V18 and since alteration of the values of resistors VR24 and VR28 will alter the mean voltage level of the control grids of valves V19 and V21 and hence of the output deflection waveforms, these variable resistors constitute a manual shift control for initial adjustment purposes.

Valve V23 constitutes a stabilising arrangement for the screen potential applied to valves V17, V19 and V21.

The X-Shift servo-control arrangements XSC, Fig. 1*b*, are shown in Fig. 12*a* and comprise two triode valves V24, V25 whose cathodes are connected in parallel and through resistor R30 to the anode of a further valve V26 arranged as a so-called "tail" valve. The cathode of valve V26 is connected to earth while its control grid is connected through resistor R31 and condenser C15 to terminal T16 to which the Gated Front Edge Light Pulse waveform, of diagram (*r*), Fig. 2, is applied over lead 107. The junction between condenser C15 and resistor R31 is taken through leak resistor R32 to a tapping on potentiometer PR33 connected between the cathode of valve V26 and a source of negative potential, −20 v.

The respective anodes of valves V24, V25 are connected to opposite ends of a centre-tapped primary winding of a transformer TR1, the said centre tap being connected to a suitable source of positive anode potential, +300 v.

The control grid of valve V25 is connected through resistor R34 to a source of positive potential, +100 v., whereas the control grid of valve V24 is connected through resistor R35 and further resistor R36 to a positive source of potential, +75 v.; in addition the junction point between resistors R35 and R36 is connected through condenser C16 to terminal T15 to which is supplied the Front Edge Strobe waveform of diagram (*n*), Fig. 2, over lead 113.

The secondary winding of the transformer TR1 has one end connected to the earthed terminal of condenser C17 while its other end is connected by way of diode D17 to the other terminal of said condenser C17 and also by way of condenser C18 and reversed diode D18 to the same other terminal of said condenser C17. The junction between the condenser C18 and the anode of diode D18 is connected by way of resistor R37 to a source of negative potential, −10 v.

The unearthed terminal of condenser C17 is connected by way of resistor R38 to the control grid of a further valve V27 whose anode is connected back to its control grid by way of condenser C19 and also by way of network of resistors R39, R40 and R41 to the control grid of a cathode follower valve V28. The lower end of resistor R40 and the cathode load resistor R42 of valve V28 are connected to a source of negative potential, −150 v., while the cathode of the valve V28 is connected through resistor R43 to terminal T17 and thence by way of load 129 to the terminal T12 of Fig. 11.

The operation of such X-Shift servo-arrangements is as follows. Valve V26 is normally held cut off by the negative bias applied to its control grid from potentiometer PR33. The valve is, however, turned-on during the period of each of the Gated Front Edge Light Pulses of waveform (*r*) which are derived from the passage of the beam of cathode-ray-tube 17 over one or other of the holes 70, 72 or 74 immediately in front of the first, *p*0 digit hole in any of the punch-hole rows of the cards.

When thus turned on, the circuit of valves V24 and V25 becomes operative. Valve 25 is provided with a higher standing positive bias potential on its control grid than valve V24 and, in the absence of any modifying input to the control grid of valve V24, is the only valve of the pair which is conducting. Valve V24 is, however, supplied through terminal T15 with the Front Edge Strobe Pulse waveform of diagram (*n*) Fig. 2, so that, if the Front Edge Light pulse applied to valve V26 is approximately correct in its timing, this valve V24 will already be driven positive at the instant of turn-on of valve V26 and this valve V24 and not valve V25 will conduct when the circuit is first energised. There will thus be a pulse of current in one direction through the secondary winding of transformer TR1 and this, through one of the diodes D17, D18, will alter the charge on the condenser C17 by a certain amount and at a certain polarity.

The trailing edges of the Front and Back Edge Strobe pulses are arranged to terminate at instants which are coincident with the mid-points of the *p*44 and *p*40 *p*-Pulses respectively and, in consequence, with the equivalent mid-point of any Gated Light Pulse which is correctly timed. Upon the termination of the Front Edge Strobe Pulse applied to valve V24, that valve is immediately cut-off and valve V25 turned on instead, due to the aforesaid higher standing bias potential. Under these conditions a pulse of current will be induced in the secondary winding of the transformer TR1 in a direction opposite to the first as indicated in diagram (*t*), Fig. 2, and the previous alteration of charge on the condenser C17 will be either partly or wholly cancelled out or possibly even superseded by an alternation of charge in the opposite direction, dependent upon the relative time durations of the two portions into which the gated light pulse is split by the rear edge of the Strobe pulse.

Any alteration of the mean potential of condenser C17 is applied to the degenerative type amplifier valve V27 and causes, through the cathode follower stage V28, such an alteration of the potential of the control grid of valve V19, Fig. 11, as will produce X-Shift displacement of the beam of tube 17 in a direction which will tend to correct any deviation of registration of the light spot, in the X-scan direction, with the holes 70, 72 or 74 relative to the digit-intervals of the machine operating rhythm.

It will be noted that control is exercised by division of the gater light pulse in two portions which are then tested for equality and that control is not determined by the actual time duration of either portion of the split pulse. In consequence, this X-Shift servo control is not affected by any alteration of the width of the gated light pulse as may occur with the triangular holes 72, 74 due to displacement in the Y-scanning direction.

The X-Rate servo control arrangements XRC, Fig. 1*b*, are shown in Fig. 12*b* and comprise a somewhat similar arrangement of triode valves V30, V31 and "tail" valve V32 operating to control the charge upon condenser C21 through transformer TR2 and diodes D20, D21. The input to valve V32 by way of lead 110 and terminal T19 is, in this instance, the Gated Back Edge Light Pulse waveform of diagram (*s*), Fig. 2, while the input to valve V30 by way of lead 114 and terminal T18 is the Back Edge Strobe waveform of diagram (*o*), Fig. 2. The resultant charging current waveform to the condenser C21 is illustrated (for the ideal or correctly synchronized condition) in diagram (*u*), Fig. 2.

As with the X-Shift arrangements, any alteration of the mean potential of condenser C21 is fed to the degenerative amplifier valve V33 and provides, through the cathode follower valve V34, terminal T20 and lead 130, a suitable variation in the bleed current supply to the Miller condenser C13 of Fig. 11 as will alter the rate of run-down of the valve V17 so as to bring the time of registration of the light spot with the rear edge holes 71, 73, 75 back into coincidence with the *p*40 Dash pulse time.

The Y-Time Base generating arrangements require to be so synchronised with the scanning movements of the beam of the tube 10 in the main store MS of the associated computing machine that Line 0 of the card store is scanned at the same time as Line 0 of the main store and so on. For effecting this synchronisation the Y-Trigger waveform of diagram (K), Fig. 3, is provided by the trigger circuit YTT, Fig. 1*b*. The circuit arrangements for this Y-Trigger waveform generator are shown in Fig. 13 and comprise a valve V36 to whose control grid is applied the counter waveform C3 of diagram (*h*), Fig. 3, already existing in the associated computing machine. This waveform is fed to terminal T22 over lead 126 and then through condenser C23 and stopper resistor R45 to the control grid of the valve which is provided with a negative bias by the potential drop across cathode resistor R51, through leak resistor R46.

The anode of valve V36 is coupled through condenser C24 and diode D23 to the control grid of valve V37. The control grid of this valve V37 is also supplied with the New B. O. waveform of diagram (*m*) Fig. 2, by way of lead 127, terminal T23, condenser C26 and diode D24. The junction of the anode of diode D23, cathode of diode D24 and the control grid of valve V37 is connected also to one side of a condenser C25 whose other terminal is earthed. The cathode of diode D23 is connected to earth by way of leak resistance R47 while the anode of diode D24 is biased negatively by about −9 v. through resistor R48 connected to a tapping between resistors R49 and R50 disposed between earth and a source of negative potential, −150 v.

The anode of valve V37 is D. C. coupled to the control grid of valve V38 whose anode is similarly coupled to the control-grid of valve V39 which is arranged as a cathode follower with the cathode end of its load resistance R51 connected to terminal T24 by which the output Y-Trigger waveform is supplied over leads 116 and 128 respectively to the Line 0 and Y-Time-Base units LGA and YCS, Fig. 1*b*.

The operation of this generator is as follows. Valve V37 is normally conducting whereby its anode potential is low. The resultant anode potential of valve V38 is accordingly high and the potential at output terminal T24 is at earth level.

The C3 waveform applied to terminal T22 has a positive-going step during the blackout period at the end of Line 31 scan of the main store MS. This positive step turns valve V36 hard on the resultant fall of its anode potential, after differentiation by condenser C24 and resistance R47, is applied to diode D23. This diode forms, with diode D24, a coincidence gate that when the New B. O. waveform also moves negatively at the P41 digit interval of the same blackout period, valve V37 is cut off and the resultant rise of potential at the anode of valve V37 drives valve V38 anode potential down with consequent development of a negative-going pulse in the output waveform from terminal T24.

Due to condenser C25, this state persists until the incidence of the positive-going trailing edge of the New B. O. waveform pulse (diagram *m*, Fig. 2) whereupon, a positive pulse is supplied to the condenser C25 through diode D24 to restore the operating conditions of valve V37 to their normal state. The resultant change of potential at the anode of valve V37 is communicated to the output terminal T24 as a rise to the normal earth or resting level of the output waveform.

The Y-time base circuits YCS, Fig. 1*b*, are, apart from appropriate alteration of time constant values where necessary in order to take account of the much slower scanning rate almost identical with those of the X-time base XCS shown and described in detail in connection with Fig. 11. The arrangements of the first three valves only are shown in Fig. 14.

Referring to Fig. 14, valves V41, V42 constitute the Miller type circuit equivalent to valves V17, V18 of the X-time base arrangement while valve V43 forms the equivalent of valve V20 of Fig. 11. The remaining valves, not shown, are arranged as in the circuit of Fig. 11

The run-down is controlled by the previously described Y-Trigger waveform of diagram (*k*), Fig. 3, applied through lead 128 and terminal T25 to the suppressor grid of valve V41. The requisite servo-control of both Rate and Shift is exercised through terminals T28 and T29 as described later.

The Y-Shift waveforms are arranged to be of stepped formation similar to that shown in diagram (*j*), Fig. 3, instead of a smoothly linear run-down, for the purpose of retaining a truly rectangular raster in conformity with the rectangular outline of the area 21, Fig. 4 including the information holes in the various stacked cards and for this purpose a current proportional to the voltage of the anode of the first paraphase valve V20 of the X-time base, Fig. 11, is injected into the Miller run-down circuit of valves V41 and V42 by way of a connection through lead 134, terminal T30 and resistor R53.

As in the case of the X-time base circuits, manual shift controls of variable resistors VR54 and VR55 are provided for initial setting-up purposes.

For the purpose of servo-controlling the Y-time base circuits YCS it is necessary to provide the waveform shown in diagram (*l*), Fig. 3, and known as the Line 0 waveform. This waveform is generated by the device LGA, Fig. 1*b*, and having the circuit arrangements shown in Fig. 15. These comprise a valve V49 to whose control grid is applied the New B. O. waveform of diagram (*m*), Fig. 2, through lead 115 and terminal T31. This valve is normally turned fully on since its cathode is connected to earth direct. The anode of valve V49 is coupled by way of condenser C28 and diode D26 to one terminal of a condenser C29 connected between the control-grid and the earthed cathode of a further valve V50. The same terminal of the condenser C29 is connected by way of diode D27 to terminal T32 to which is applied the Y-Trigger waveform of diagram (*k*), Fig. 3. The anode of diode D26 is connected by way of resistor R55 to a source of negative potential, −20 v. Valve V50 has an anode load resistor R56 while its anode is connected to output terminal T33 by which the Line 0 waveform is supplied over lead 117 to the Y-Shift servo arrangements YSC.

The operation of this circuit is as follows. The Y-Trigger waveform at terminal T32 will cause charging of condenser C29 negatively during the operative pulse at the end of the preceding Line 31. The negative potential on condenser C29, which causes cut-off of normally conductive valve V50, will be held at the level of approximately −20 v. due to the biasing of diode D26 until the arrival of the leading edge of the next subsequent New B. O. waveform pulse, i. e. that which occurs at the end of Line 0. The leading edge of this pulse cuts off valve V49 and the resultant differentiated positive pulse through condenser C28 and diode D26 discharges the condenser C29 and so turns on valve V50 once again. The resultant anode output of valve V50 provides the required waveform.

It is similarly necessary, for Y servo control purposes, to provide the Line 31 waveform shown in diagram (*m*), Fig. 3. This waveform is generated by the device LGB, Fig. 1*b*, having the circuit arrangements shown in Fig. 16. These circuit arrangements comprise a trigger circuit TC of the two-stable-state type as shown, for example, in "Ultra High Frequency Techniques," by Brainerd et al. (published 1942 by Chapman and Hall), page 174, Fig. 4–8, and whose triggering input lead 140 is connected to a multiple diode "AND" gate G10 having six input terminals T34–T39 which are supplied with the New B. O. waveform, C0, C1, C2, C3 and Halver-A waveforms shown in diagrams (*n*), (*e*), (*f*), (*g*), (*h*) and (*d*) respectively, Fig. 3. Each of these separate input waveforms are applied to the anodes of respective diodes D30 to D35 whose cathodes are connected in parallel and returned to a source of negative potential, −150 v., through resistor R58 and also connected to the triggering input lead 140 of the trigger circuit TC. Only when each of these applied waveforms provides a negative-going potential at the same instant is the trigger circuit TC operated into its triggered condition. When so operated a negative-going output from a normal earth resting level is available at terminal T41 for supply over lead 124 to the Y-Rate servo device YRC, Fig. 1*b*.

The trigger circuit TC is reset into its normal condition by the application of the differentiated negative-going edge of the next following pulse in the New B. O. waveform which is applied to terminal T40 by way of lead 125 and is fed to the resetting lead 141 of the trigger circuit TC by way of the differentiating network of condenser C31 and resistor R59 which is returned to a source of positive potential, +300 v.

As a coincident negative-going potential on each of the applied waveforms occurs only during that New Blackout pulse which precedes the scanning of the Line 31, as may be seen from inspection of the various waveforms above described, the trigger circuit TC is triggered at the leading edge of *p*41-Pulse in the Line 30 scan and remains in such triggered condition until the leading edge of the next following Blackout pulse, i. e. that occurring at the leading edge of the following *p*41-Pulse. A negative-going output as shown in diagram (*m*), Fig. 3, is therefore available over the whole of the active period of Line 31.

The Y-Shift servo control arrangements YSC, Fig. 1*b*, are generally similar to those of the X-Shift arrangements already described with reference to Fig. 12*a*, apart from suitable alteration of certain component values to take account of the slower operating speed and the modification shown in fragmentary diagram Fig. 17 from which it will be seen that while valve V52 of the pair of triode valves associated with the centre-tapped transformer TR3 is positively biased, as in the X-Shift arrangement, at +75 v., the other triode valve V53 is now also positively biased to the same level, +75 v., through resistor R61 and has its control-grid connected by way of condenser C33 to terminal T44, to which is applied, over lead 108, the Gated Front Edge Light Pulse waveform of diagram (*r*), Fig. 2. Terminal T43 is supplied, over lead 111 with the Gated Back Edge Light Pulse waveform of diagram (*s*), Fig. 2, while terminal T42 is supplied with the Line 0 waveform of diagram (*l*), Fig. 3.

In the operation of this Y-Shift servo arrangement, valve V54 is turned-on during the time of scanning of Line 0 by the storage tube 10 in the main store but, unlike the equivalent valve in the X-Shift servo arrangement, is held turned-on for the whole of the line scan period. When thus conductive the +75 v. bias on each of the valves V52, V53 is still insufficient, in the absence of any external influence, to allow appreciable current flow therethrough. When, however, the control grid of valve V53 is driven positive by the gated light pulse due to passage of the beam of cathode-ray-tube 17 over the front triangular hole 72 of the card store, a pulse of current, with one polarity, will be induced in the transformer TR3 and supplied, as before, to the charging condenser. Similarly when the said beam passes over the rear triangular hole 73 of the same Line 0, the control grid of valve V52 will be driven positive and a second pulse of current, with opposite polarity, will be applied to such charging condenser.

The resultant waveform is shown at diagram (*v*), Fig. 2. As explained in connection with Fig. 7, the relative widths of the two pulses will depend upon whether or not the scanning level of the tube beam is accurately centered upon the line of holes. Any variation of their respective widths will result in change of the charging potential of the condenser fed from the transformer TR3 and the consequential application of a corrective shift voltage to the main Y-time base circuits in precisely analogous manner to that already described.

The Y-Rate servo arrangements are identical with those of the Y-Shift arrangements just described except for the control of the tail valve equivalent of V54, Fig. 17, by the Line 31 waveform instead of the Line 0 waveform. The manner of operation is exactly analogous, any variation between the widths of the compared pulses due to holes 74, 75 of the card store causing alteration of the Y time-base run-down in a manner tending to bring the width of the pulses to equality and hence the accurate positioning of the beam of tube 17 on the last row of holes at the end of the complete raster.

It will be appreciated that, although only one complete raster of light spot movement is required for the actual reading of any one selected card, the servo-central arrangements are operating continuously since the passages formed by holes 70, 71, 72, 73 and 75 through the stack of cards are always unobscured whatever the relative positioning of any information card to the remaining information cards and the interleave cards. During card selection, which may require a time interval equal to a considerable number of complete raster operations of the tube 17, it is necessary to keep the gate device through which the output from the pulse amplifier PA is fed to the computing machine, closed but the servo-control can still continue.

While the invention has been particularly described in its application to special form of card library for an electronic digital computing machine and using a cathode-ray-tube as a light source, it will be evident that the invention is capable of wider application and the arrangements thereof may be the subject of modification. For instance, it may be employed for the reading of a card-stored information of types such as Hollerith and like cards or for providing telegraphic or other signals. Instead of utilising a cathode-ray-tube as a light source, a rotating disc or mirror type scanner could be employed and servo-controlled from the additional front and rear edge holes of each row.

We claim:

1. An arrangement for controlling the repetitive scanning movement of a light spot over a chosen path which comprises a source of master timing signals, scanning means controlled by said master timing signals for producing scanning movement of said light spot during a predetermined time period defined by said master timing signals, electric signal operated scanning control means for altering the form of said scanning movement of said light spot, a first light transmitting area of light transmititng capacity different from that of the surrounding area located at the commencement end of the chosen path, a second light transmitting area of transmitting capacity different from that of the surrounding area at the terminating end of said scanning path, electric signal generating means for deriving first and second pulse signals on passage of said light spot over said first area and said second area respectively, a source of first and second position timing signals controlled by said source of master timing signals and coincident respectively with the times when said light spot should be registered with said first area and said second area, signal comparison means supplied with said first and second pulse signals and said first and second position timing signals and providing error signals characteristic of the divergence of said light spot from said chosen path and means for supplying said error signals to said scanning control means to control the form of movement of said light spot.

2. An arrangement for controlling the repetitive scanning movement of a light spot over a chosen path which comprises a source of master timing signals, scanning means controlled by said master timing signals for producing scanning movement of said light spot during a predetermined time period defined by said master timing signals, first electric signal operated scanning control means for altering the starting position of the light spot scanning movement and second electric signal operated scanning control means for altering the rate of scanning movement of said light spot, a first light transmitting area of light transmitting capacity different from that of the surrounding area located at the commencement end of the chosen path, a second light transmitting area of transmitting capacity different from that of the surrounding area located at the terminating end of said scanning path, electric signal generating means for driving first and second pulse signals on passage of said light spot over said first area and said second area respectively, a source of first and second position timing signals controlled by said source of master timing signals and coincident respectively with the times when said light spot should be registered with said first area and said second area, signal comparison means supplied with said first and second pulse signals and said first and second position timing signals and providing first and second error signals characteristic respectively of the divergence of said light spot from registration with said first and second areas and means for supplying said first and second error signals respectively as operating signals to said first and second scanning control means.

3. An arrangement for controlling the repetitive scanning movement of a light spot from one end to the other of a chosen linear path which comprises scanning means for producing scanning movement of said light spot along a linear scanning path parallel with said chosen linear path, electric signal operated scanning control means for shifting the level of scanning movement at right angles to the direction of said linear scanning path, a first light transmitting area of light transmitting capacity different from that of the surrounding area located at the commencement end of the chosen linear path, said first area being of asymmetrical light transmitting capacity on opposite sides of the centre line of said chosen linear path, a second light transmitting area of transmitting capacity different from that of the surrounding area at the terminating end of said chosen linear path, said second area being of asymmetrical light transmitting capacity on opposite sides of the centre line of said chosen linear path in a sense inverse to that of said first area, electric signal generating means for deriving first and second pulse signals on passage of said light spot over said first area and said second area respectively, said signals varying inversely to one another in form with divergence of the scanning movement of said light spot above or below said chosen linear path, signal comparison means supplied with said first and second pulse signals and providing an error signal characteristic of the divergence of said light spot from said chosen linear path and means for supplying said error signal to said scanning control means to align said scanning movement with said chosen linear path.

4. An arrangement according to claim 3 in which said first and second areas are each of the shape of an isosceles triangle with the area at one end of the path erect upon its base and the area at the other end of the path inverted upon its apex.

5. An arrangement for controlling the repetitive scanning movement of a light spot from one end to the other of a chosen linear path which comprises scanning means for producing scanning movement of said light spot along a linear scanning path parallel to said chosen linear path, first electric signal operated scanning control means for altering the starting position of the light spot scanning movement, second electric signal operated scanning control means for altering the rate of scanning movemet of said light spot and third electric signal operated scanning control means for shifting the level of scanning movement at right angles to the direction of said linear path, a first light transmitting area of light transmitting capacity different from that of the surrounding area located at the commencement end of the chosen linear path, said first area being of asymmetrical light transmitting capacity on opposite sides of the centre line of said chosen linear path, a second light transmitting area of transmitting capacity different from that of the surrounding area at the terminating end of said chosen linear path, said second area being of asymmetrical light transmitting capacity on opposite sides of the centre line of said chosen linear path in a sense inverse to that of the first area, electric signal generating means for deriving first and second pulse signals on passage of said light spot over said first area and said second area respectively, said signals varying inversely to one another in form with divergence of the scanning movement of said light spot above or below said chosen linear path, a source of first and second timing signals coincident respectively with the times when said light spot should be registered with said first area and said second area, first signal comparison means supplied with said first and second pulse signals and said first and second timing signals and providing first and second error signals characteristic respectively of the divergence of said light spot from registration with said first and second area, means for supplying said first and second error signals respectively as operating signals to said first and second scanning control means, second signal comparison means supplied with said first and second pulse signals and providing a third error signal characteristic of the divergence of said light spot from said chosen linear path and means for supplying said third error signal to said third scanning control means as an operating signal to align said scanning movement with said chosen linear path.

6. An arrangement according to claim 5 in which said first and second areas are of the shape of an isosceles triangle with the area at one end of the path erect upon its base and the area at the other end of the path inverted upon its apex.

7. An arrangement for controlling the repetitive scanning movement of a light spot over a chosen path so as to be in synchronism with events in associated apparatus which are related to respectively different positions of said path which comprises a mask intersecting the light ray paths of said light spot, said mask being provided with a first light transmitting area whose light transmitting capacity is different from that of the surrounding mask area and located at the commencement end of said chosen path and a second light transmitting area of light transmitting capacity different from that of the surrounding mask area and located at the terminating end of said scanning path, electric signal generating means for generating first and second electric pulse signals on passage of said light spot over said first area, and said second area respectively, timing signal generating means in said associated apparatus providing a first timing signal at the instant when said light beam should be in register with said first area and a second timing signal when said light spot should be in register with said terminating area, error detecting apparatus supplied with said first and second electric pulse signals and said first and second timing signals, said error detecting apparatus providing first and second error signals characteristic respectively of divergence of said light spot from registration with said first and second areas and scan modifying means operated by said first and second error signals to correct the position of said light spot with respect to said first and second areas.

8. An arrangement for controlling the repetitive scanning movement of a light spot over a chosen path for illuminating in turn each of the successive recording positions of a card having information items recorded thereon as a linear row of separate areas of different light transmitting capacity which comprises a source of master timing signals scanning means controlled by said master timing signals for effecting movement of said light spot along said row during a predetermined time period defined by said master timing signals, electric signal operated scanning control means for altering the form of scanning movement of said light spot, an additional first recording area in said card at a predetermined position before the beginning of said row and a second additional recording area in a predetermined position after the end of said row, pulse signal generating means operated by light passing through said first and second additional recording areas to produce first and second pulse signals, a source of position timing signals providing a front edge timing signal coincident in time with the required scanning instant of said light spot over said first area and a rear edge timing signal coincident in timing with the required scanning instant of said light spot over said second area, first and second signal comparison means supplied respectively with said front and second pulse signals and with said front and rear edge timing signals to provide first and second error signals characteristic respectively of the divergence of said light spot from the required sequential registration with said first and second areas and means for supplying said error signals to said scanning control means to control the movement of said light spot.

9. An arrangement for controlling the repetitive scanning movement of a light spot to illuminate in turn and in synchronism with related events in an associated device each of the successive recording positions of a card having information recorded thereon as a plurality of parallel rows of discrete areas of different light transmitting capacity, which comprises a source of master timing signals synchronized with said associated device, raster scanning means controlled by said master timing signals for producing scanning movement of said light spot along each row in turn during time periods determined by said master timing signals, first electric signal operated scanning control means for altering the starting position of the light spot scanning movement along each row of the raster movement and second electric signal operated scanning control means for altering the rate of scanning movement of said light spot along each row of the raster movement, a first light transmitting area of light transmitting capacity different from that of the surrounding area located at the commencement end of each row, a second light transmitting area of transmitting capacity different from that of the surrounding area at the terminating end of each row, electric signal generating means for deriving first and second pulse signals on passage of said light spot over said first area and said second area respectively of each of said rows, a position timing signal source controlled by said source of master timing signals and providing first and second position timing signals coincident respectively with the related event times in said associated device when said light spot should be registered with said first area and said second area of each of said rows, signal comparison means supplied with said first and second pulse signals and said first and second position timing signals and providing first and second error signals characteristic respectively of the divergence of said light spot from registration with said first and second areas and means for supplying said first and second error signals respectively as operating signals to said first and second scanning control means.

10. An arrangement for controlling the repetitive scanning movement of a light spot to illuminate in turn and in synchronism with related events in an associated device, each of the successive recording positions of a card having information recorded thereon as a plurality of parallel rows of discrete areas of different light transmitting capacity which comprises scanning means for producing raster scanning movement of said light spot over each row in turn, first electric signal operated scanning control means for altering the starting position of the light spot scanning movement over each row, second electric signal operated scanning control means for altering the rate of scanning movement of said light spot over each row, third electric signal operated scanning control means for shifting the level of scanning movement at right angles to the direction of said rows and fourth electric signal operated scanning control means for altering the rate of displacement movement of the light spot at right angles to the directions of said rows during the raster form displacement, a first light transmitting area of light transmitting capacity different from that of the surrounding area located at the commencement end of each row, said first area of the first and last rows being of asymmetrical light transmitting capacity on opposite sides of the centre line of said row, a second light transmitting area of transmitting capacity different from that of the surrounding area at the terminating end of each row, said second area of said first and last rows being of asymmetrical light transmitting capacity on opposite sides of the centre line of said row in a sense inverse to that of the first area of the same row, electric signal generating means for deriving first and second pulse signals on passage of said light spot over said first area and said second area respectively of each of said rows, said signals for said first and last rows varying inversely to one another in form with divergence of the scanning movement of said light spot above or below the centre lines of said rows, a source of first and second timing signals coincident respectively with the related event times in said associated device when said light spot should be registered with said first area and said second area of each of said rows, first signal comparison means supplied with said first and second pulse signals and said first and second timing signals and providing first and second error signals characteristic respectively of the divergence of said light spot from registration with said first and second areas in each row, means for supplying said first and second error signals respectively as operating signals to said first and second scanning control means, second signal comparison means supplied with said first and second pulse signals derived from said first and last rows and providing third and fourth error signals characteristic respectively of the divergence of said light spot from alignment with said first and last rows and means for supplying said third and fourth error signals as operating signals to said third and fourth scanning control means respectively.

11. An arrangement in accordance with claim 10 in which said first and second areas of said first and last rows are of the shape of an isosceles triangle with the areas at the opposite ends of each of said first and last rows inverted with respect to one another and with the first areas of each of said first and last rows inverted with respect to one another.

12. An arrangement according to claim 8 wherein said pulse signal generating means comprises a photocell, light directing means for concentrating light from said light spot onto said photocell and an electron discharge tube circuit connected to said photocell, said circuit providing a signal output comprising pulses whose starting and finishing instants are related to the movement of said light spot across said recording areas, and wherein each of said signal comparison means comprises circuit means controlled by said output signal pulses supplying a constant value electric current during the time period of said pulse, a capacitor, electronic switching means operated by said front or rear edge timing signals and circuit means for supplying said constant current to said capacitor through said switching means to reverse the direction of current flow by said timing signals whereby the net charge acquired by said capacitor represents the timing error of said light spot.

13. An arrangement according to claim 12 wherein said electronic switching means each comprise a transformer having a centre-tapped primary winding and a secondary winding connected to said capacitor, two electron discharge devices connected to supply current respectively to opposite halves of said primary winding, means controlled by an output pulse signal for conditioning both of said discharge devices for operation during the time period of said output pulse signal with one device conducting and the other non-conducting and reversing means controlled by said edge timing signal for reversing the conductivity state of said discharge devices.

14. An arrangement according to claim 13 wherein said conditioning means comprises a third electron discharge device having its anode connected to each of the cathodes of said two electron discharge devices and its control grid supplied with said output pulse signals.

15. An arrangement according to claim 1 which comprises a cathode ray tube for providing said light spot by bombardment of its fluorescent screen by the tube beam and wherein said scanning means comprises a source of deflecting potentials applied to the deflecting means of said tube.

16. An arrangement according to claim 9 which comprises a cathode ray tube for providing said light source by bombardment of its fluorescent screen by the tube beam and wherein said raster scanning means comprises sources of X and Y deflecting potentials applied respectively to the X and Y deflecting means of said tube.

17. An arrangement according to claim 1 in combination with an electronic digital computing machine wherein said source of master timing signals comprises the master clock control of said computing machine.

18. An information storage card for use in an arrangement according to claim 9 which comprises a plurality of rows of information-recording positions for hole punchings disposed parallel to one another within a rectangular recording zone and additional recording holes at predetermined positions before the beginning of and after the end of each of said rows.

19. An information storage card according to claim 18 in which the additional holes of the first row are each of isosceles triangle shape and inverted with respect to each other and in which the additional holes of the last row are each of isosceles triangle shape and inverted with respect to each other and also with respect to the corresponding holes of the first row.

References Cited in the file of this patent

UNITED STATES PATENTS

| | | |
|---|---|---|
| 2,057,773 | Finch | Oct. 20, 1936 |
| 2,275,017 | McNaney | Mar. 3, 1942 |
| 2,302,009 | Dickinson | Nov. 17, 1942 |
| 2,320,337 | Bryce | June 1, 1943 |
| 2,401,021 | Rosenberg | May 28, 1946 |
| 2,586,711 | Potts | Feb. 19, 1952 |
| 2,586,963 | Knutsen | Feb. 26, 1952 |